United States Patent
Chae et al.

(10) Patent No.: US 11,385,315 B2
(45) Date of Patent: Jul. 12, 2022

(54) METHOD FOR DETERMINING A POSITION OF NLOS TX UE

(71) Applicant: LG ELECTRONICS INC., Seoul (KR)

(72) Inventors: Hyukjin Chae, Seoul (KR);
Seung-Woo Ko, Pok Fu Lam (HK);
Kaibin Huang, Fok Fu Lam (HK);
Kaifeng Han, Pok Fu Lam (HK)

(73) Assignee: LG ELECTRONICS INC., Seoul (KR)

( * ) Notice: Subject to any disclaimer, the term of this patent is extended or adjusted under 35 U.S.C. 154(b) by 139 days.

(21) Appl. No.: 16/971,495

(22) PCT Filed: Feb. 25, 2019

(86) PCT No.: PCT/KR2019/002285
§ 371 (c)(1),
(2) Date: Aug. 20, 2020

(87) PCT Pub. No.: WO2019/164370
PCT Pub. Date: Aug. 29, 2019

(65) Prior Publication Data
US 2020/0393532 A1    Dec. 17, 2020

Related U.S. Application Data

(60) Provisional application No. 62/634,209, filed on Feb. 23, 2018.

(30) Foreign Application Priority Data

Apr. 10, 2018    (KR) .................... 10-2018-0041597
Apr. 27, 2018    (KR) .................... 10-2018-0049443
Jul. 31, 2018    (KR) .................... 10-2018-0089020

(51) Int. Cl.
*G01S 5/02* (2010.01)
*G01S 1/54* (2006.01)

(52) U.S. Cl.
CPC .............. *G01S 5/0273* (2013.01); *G01S 1/54* (2013.01); *G01S 5/0289* (2013.01)

(58) Field of Classification Search
CPC ........ G01S 5/02; G01S 5/0273; G01S 5/0289; G01S 1/54; G01S 13/93; H04L 25/03; H04W 64/00
See application file for complete search history.

(56) References Cited

U.S. PATENT DOCUMENTS

2014/0327579 A1    11/2014    Hart et al.
2019/0223140 A1*    7/2019    Grossmann .............. G01S 5/12
2021/0364593 A1*    11/2021    Fellhauer .................. G01S 5/10

FOREIGN PATENT DOCUMENTS

WO    2006088599    8/2006
WO    2013084030    6/2013
WO    2017083414    5/2017

OTHER PUBLICATIONS

PCT International Application No. PCT/KR2019/002285, Notification of Transmittal of The International Search Report and the Written Opinion of the International Searching Authority, or Declaration dated Jun. 21, 2019, 10 pages.

(Continued)

*Primary Examiner* — Siu M Lee
(74) *Attorney, Agent, or Firm* — Lee, Hong, Degerman, Kang & Waimey PC

(57) ABSTRACT

One embodiment is a method including: receiving signals of at least 4 paths from the Tx UE; measuring a ToA, an AoA, an AoD of each of the signals of 4 paths, determining each distance between the Rx UE and each scatter of each 4 paths, each distance between the Rx UE and the Tx UE and a driving direction of the Tx UE, based on the ToA, AoA and (Continued)

AoD; determining a position of the Tx UE based on results of measurement and results of the determination, wherein an assumption that each of x-axis distance and y-axis distance between the Tx UE and Rx UE based on the AoA, AoD and the driving direction of the Tx UE are identical in signal path 1 and signal path p (p=2, 3, 4) is used for determination of the position.

14 Claims, 24 Drawing Sheets

(56) References Cited

OTHER PUBLICATIONS

Shikur, B. et al., "ToA/AoA/Ao D-based 3-D mobile terminal tracking in NLOS multipath environments", 2012 9th Workshop on Positioning, Navigation and Communication, Mar. 2012, pp. 201-205, 7 pages.

\* cited by examiner (a)

(b)

(a) Sensing disk (2D)

(b) Sensing sphere (3D)

(c) Sensing box (2D)

(d) Sensing cuboid (3D)

(a) Highway scenario (b) Rural scenario

METHOD FOR DETERMINING A POSITION OF NLOS TX UE

CROSS-REFERENCE TO RELATED APPLICATIONS

This application is the National Stage filing under 35 U.S.C. 371 of International Application No. PCT/KR2019/002285, filed on Feb. 25, 2019, which claims the benefit of U.S. Provisional Application No. 62/634,209, filed on Feb. 23, 2018, and also claims the benefit of earlier filing date and right of priority to Korean Application Nos. 10-2018-0041597, filed on Apr. 10, 2018, 10-2018-0049443, filed on Apr. 27, 2018, and 10-2018-0089020, filed on Jul. 31, 2018, the contents of which are all hereby incorporated by reference herein in their entirety.

TECHNICAL FIELD

The following description relates to a wireless communication system and, more particularly, to a method and apparatus for determining a position of Tx user equipment (UE) by a Rx UE.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

Device-to-device (D2D) communication is a communication scheme in which a direct link is established between user equipments (UEs) and the UEs exchange voice and data directly without an evolved Node B (eNB). D2D communication may cover UE-to-UE communication and peer-to-peer communication. In addition, D2D communication may be applied to machine-to-machine (M2M) communication and machine type communication (MTC).

D2D communication is under consideration as a solution to the overhead of an eNB caused by rapidly increasing data traffic. For example, since devices exchange data directly with each other without an eNB by D2D communication, compared to legacy wireless communication, network overhead may be reduced. Further, it is expected that the introduction of D2D communication will reduce procedures of an eNB, reduce the power consumption of devices participating in D2D communication, increase data transmission rates, increase the accommodation capability of a network, distribute load, and extend cell coverage.

At present, vehicle-to-everything (V2X) communication in conjunction with D2D communication is under consideration. In concept, V2X communication covers vehicle-to-vehicle (V2V) communication, vehicle-to-pedestrian (V2P) communication for communication between a vehicle and a different kind of terminal, and vehicle-to-infrastructure (V2I) communication for communication between a vehicle and a roadside unit (RSU). Autonomous driving (J. Baber, J. Kolodko, T. Noel, M. Parent, and L. Vlacic, "Cooperative autonomous driving: intelligent vehicles sharing city roads," IEEE Robotics and Automation Mag., vol. 12, no. 1, pp. 44-49, 2005. C. Urmson, J. Anhalt, D. Bagnell, C. Baker, R. Bittner, M. Clark, J. Dolan, D. Duggins, T. Galatali, C. Geyer, et al., "Autonomous driving in urban environments: Boss and the urban challenge," Journal of Field Robotics, vol. 25, no. 8, pp. 425-466, 2008.) are widely envisioned to be a disruptive technology that will eliminate accidence, traffic congestion, and reduce greenhouse gas emission by enabling transportation a fully automatic process. The potential huge impact of the cross-disciplinary technology has attracted heavy R&D investments by leading car manufactures (e.g., Toyota, Tesla, BMW) and Internet companies (e.g., Google, Apple, Baidu). Specifically, vehicular positioning plays an important role in the autonomous driving-scenario, as it enables the autonomous vehicles to accomplish lots of tasks, such as deriving-path planning and navigation (I. Skog and P. Handel, "In-car positioning and navigation technologies—a survey," IEEE Trans. Intell. Transp. Syst., vol. 10, pp. 4-21, March 2009., K. Jo, K. Chu, and M. Sunwoo, "Interacting multiple model filter-based sensor fusion of gps with in-vehicle sensors for real-time vehicle positioning," IEEE Trans. Intell. Transp. Syst., vol. 13, pp. 329-343, March 2012.), to guarantee a safely driving in streets. Therefore, improving the accuracy of vehicular positioning will enhance the functionality of the autonomous vehicles.

DISCLOSURE

Technical Problem

An aspect of the present disclosure is to consider the autonomous driving scenario. In order to obtain the accurate positioning and geometry/shape information of hidden/non-line-of-sight (NLoS) vehicles, a novel positioning and geometry detection technology is proposed by exploiting multi-path wireless signals. Our propose technique can estimate the position, moving direction, shape, and track the trajectory of hidden vehicle in one way, which means that exploiting multiple antennas and multi-path channels can estimate location, distance and vehicle geometry without returning signaling from the other vehicles.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In one aspect of the present disclosure, there is provided a method for determining a position of Tx user equipment (UE) by a Rx UE in a wireless communication system, the method comprising: receiving, by the Rx UE, signals of at least 4 paths from the Tx UE; measuring, by the Rx UE, a time of arrival (ToA), an angle of arrival (AoA), an angle of departure (AoD) of each of the signals of 4 paths, determing, by the Rx UE, each distance between the Rx UE and each scatter of each 4 paths, each distance between the Rx UE and the Tx UE and a driving direction of the Tx UE, based on the ToA, AoA and AoD; determining, by the Rx UE, a position of the Tx UE based on results of measurement and results of the determination, wherein an assumption that each of x-axis distance and y-axis distance between the Tx UE and Rx UE based on the AoA, AoD and the driving direction of the Tx UE are identical in signal path 1 and signal path p (p=2, 3, 4) is used for determination of the position.

In another aspect of the present disclosure, there is provided a first user equipment (UE) for determining a position of Tx UE in a wireless communication system, the Rx UE comprising: a memory; and a processor coupled with the memory, wherein the processor is configured to receive signals of at least 4 paths from the Tx UE, to measure a time of arrival (ToA), an angle of arrival (AoA), an angle of departure (AoD) of each of the signals of 4 paths, to determine each distance between the Rx UE and each scatter of each 4 paths, each distance between the Rx UE and the Tx UE and a driving direction of the Tx UE, based on the ToA, AoA and AoD and to determine a position of the Tx UE based on results of measurement and results of the determination, wherein an assumption that each of x-axis distance and y-axis distance between the Tx UE and Rx UE based on the AoA, AoD and the driving direction of the Tx UE are identical in signal path 1 and signal path p (p=2, 3, 4) is used for determination of the position.

The distance between the Rx UE and the Tx UE in signal path p is summation of a distance between the Rx UE and the Tx UE in signal path 1 and a distance based on time difference of arrival (TDoA).

The each of the signals of at least 4 paths was reflected only once due to each scatter of each 4 paths.

The x-axis corresponds to a driving direction of the Rx UE and the positon of the Rx UE is an origin of the coordinate.

The position of the Tx UE corresponds to a location in the coordinate.

The signals of at least 4 paths are orthogonal each other.

The Tx UE is a hidden vehicle in None line of sight (NLoS) of the Rx UE.

The ToA is measured by using a matched filtered.

The AoA and the AoD are measured by using a 2D multiple signal classification (MUSIC) algorithm.

The values of the AoA, the AoD, and the ToD are assumed to be constants during a sensing period.

The assumption is expressed in following equation, $$\begin{cases} x_p = v_p\cos(\theta_p) - (d_p - v_p)\cos(\varphi_p + \omega) = \\ \quad v_1\cos(\theta_1) - (d_1 - v_1)\cos(\varphi_1 + \omega), \\ y_p = v_p\sin(\theta_p) - (d_p - v_p)\sin(\varphi_p + \omega) = \\ \quad v_1\sin(\theta_1) - (d_1 - v_1)\sin(\varphi_1 + \omega) \end{cases}, p \in \mathcal{P}.$$

wherein p is path, $\theta_p$ is the AoA, $\varphi_p$ is the AoD, $\lambda_p$ is the ToA, $v_p$ is propagation distances between the Tx UE and the scatter of path p, $d_p$ is a propagation distances between the Tx UE and Rx UE, $\omega$ is driving direction of Tx UE.

Advantageous Effects

According to the present disclosure, Due to the above one way positioning, fast and accurate positioning can be achieved. The propose method can compensate for the drawbacks of existing autonomous driving sensing techniques (e.g., Radar, LiDAR, Camera, GPS) and further enhance the reliability, latency, and efficiency of autonomous vehicles as well as contribute to the development of future smart cities.

It will be appreciated by persons skilled in the art that the effects that can be achieved with the present disclosure are not limited to what has been particularly described herein above and other advantages of the present disclosure will be more clearly understood from the following detailed description taken in conjunction with the accompanying drawings.

DESCRIPTION OF DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

BEST MODE

Figure 1:
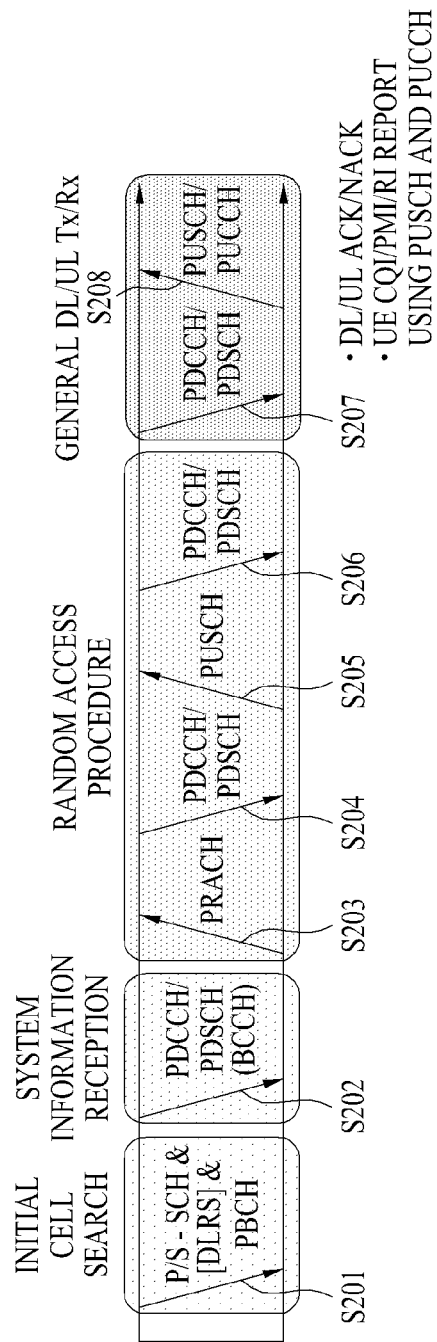
FIG. 1 is a view illustrating physical channels and a general signal transmission method using the physical channels in a 3GPP system.

The configuration, operation, and other features of the present disclosure will readily be understood with embodiments of the present disclosure described with reference to the attached drawings. Embodiments of the present disclosure as set forth herein are examples in which the technical features of the present disclosure are applied to a 3$^{rd}$ generation partnership project (3GPP) system.

While embodiments of the present disclosure are described in the context of long term evolution (LTE) and LTE-advanced (LTE-A) systems, they are purely exemplary. Therefore, the embodiments of the present disclosure are applicable to any other communication system as long as the above definitions are valid for the communication system.

The term, Base Station (BS) may be used to cover the meanings of terms including remote radio head (RRH), evolved Node B (eNB or eNode B), transmission point (TP), reception point (RP), relay, and so on.

The 3GPP communication standards define downlink (DL) physical channels corresponding to resource elements (REs) carrying information originated from a higher layer, and DL physical signals which are used in the physical layer and correspond to REs which do not carry information originated from a higher layer. For example, physical downlink shared channel (PDSCH), physical broadcast channel (PBCH), physical multicast channel (PMCH), physical control format indicator channel (PCFICH), physical downlink control channel (PDCCH), and physical hybrid ARQ indicator channel (PHICH) are defined as DL physical channels, and reference signals (RSs) and synchronization signals (SSs) are defined as DL physical signals. An RS, also called a pilot signal, is a signal with a predefined special waveform known to both a gNode B (gNB) and a UE. For example, cell specific RS, UE-specific RS (UE-RS), positioning RS (PRS), and channel state information RS (CSI-RS) are defined as DL RSs. The 3GPP LTE/LTE-A standards define uplink (UL) physical channels corresponding to REs carrying information originated from a higher layer, and UL physical signals which are used in the physical layer and correspond to REs which do not carry information originated from a higher layer. For example, physical uplink shared channel (PUSCH), physical uplink control channel (PUCCH), and physical random access channel (PRACH) are defined as UL physical channels, and a demodulation reference signal (DMRS) for a UL control/data signal, and a sounding reference signal (SRS) used for UL channel measurement are defined as UL physical signals.

In the present disclosure, the PDCCH/PCFICH/PHICH/PDSCH refers to a set of time-frequency resources or a set of REs, which carry downlink control information (DCI)/a control format indicator (CFI)/a DL acknowledgement/negative acknowledgement (ACK/NACK)/DL data. Further, the PUCCH/PUSCH/PRACH refers to a set of time-frequency resources or a set of REs, which carry UL control information (UCI)/UL data/a random access signal. In the present disclosure, particularly a time-frequency resource or an RE which is allocated to or belongs to the PDCCH/PCFICH/PHICH/PDSCH/PUCCH/PUSCH/PRACH is referred to as a PDCCH RE/PCFICH RE/PHICH RE/PDSCH RE/PUCCH RE/PUSCH RE/PRACH RE or a PDCCH resource/PCFICH resource/PHICH resource/PDSCH resource/PUCCH resource/PUSCH resource/PRACH resource. Hereinbelow, if it is said that a UE transmits a PUCCH/PUSCH/PRACH, this means that UCI/UL data/a random access signal is transmitted on or through the PUCCH/PUSCH/PRACH. Further, if it is said that a gNB transmits a PDCCH/PCFICH/PHICH/PDSCH, this means that DCI/control information is transmitted on or through the PDCCH/PCFICH/PHICH/PDSCH.

Hereinbelow, an orthogonal frequency division multiplexing (OFDM) symbol/carrier/subcarrier/RE to which a CRS/DMRS/CSI-RS/SRS/UE-RS is allocated to or for which the CRS/DMRS/CSI-RS/SRS/UE-RS is configured is referred to as a CRS/DMRS/CSI-RS/SRS/UE-RS symbol/carrier/subcarrier/RE. For example, an OFDM symbol to which a tracking RS (TRS) is allocated or for which the TRS is configured is referred to as a TRS symbol, a subcarrier to which a TRS is allocated or for which the TRS is configured is referred to as a TRS subcarrier, and an RE to which a TRS is allocated or for which the TRS is configured is referred to as a TRS RE. Further, a subframe configured to transmit a TRS is referred to as a TRS subframe. Further, a subframe carrying a broadcast signal is referred to as a broadcast subframe or a PBCH subframe, and a subframe carrying a synchronization signal (SS) (e.g., a primary synchronization signal (PSS) and/or a secondary synchronization signal (SSS)) is referred to as an SS subframe or a PSS/SSS subframe. An OFDM symbol/subcarrier/RE to which a PSS/SSS is allocated or for which the PSS/SSS is configured is referred to as a PSS/SSS symbol/subcarrier/RE.

In the present disclosure, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna port configured to transmit CRSs may be distinguished from each other by the positions of REs occupied by the CRSs according to CRS ports, antenna ports configured to transmit UE-RSs may be distinguished from each other by the positions of REs occupied by the UE-RSs according to UE-RS ports, and antenna ports configured to transmit CSI-RSs may be distinguished from each other by the positions of REs occupied by the CSI-RSs according to CSI-RS ports. Therefore, the term CRS/UE-RS/CSI-RS/TRS port is also used to refer to a pattern of REs occupied by a CRS/UE-RS/CSI-RS/TRS in a predetermined resource area.

FIG. 1 illustrates physical channels and a general method for transmitting signals on the physical channels in the 3GPP system.

Referring to FIG. 1, when a UE is powered on or enters a new cell, the UE performs initial cell search (S201). The initial cell search involves acquisition of synchronization to an eNB. Specifically, the UE synchronizes its timing to the eNB and acquires a cell identifier (ID) and other information by receiving a primary synchronization channel (P-SCH) and a secondary synchronization channel (S-SCH) from the eNB. Then the UE may acquire information broadcast in the cell by receiving a physical broadcast channel (PBCH) from the eNB. During the initial cell search, the UE may monitor a DL channel state by receiving a DownLink reference signal (DL RS).

After the initial cell search, the UE may acquire detailed system information by receiving a physical downlink control channel (PDCCH) and receiving a physical downlink shared channel (PDSCH) based on information included in the PDCCH (S202).

If the UE initially accesses the eNB or has no radio resources for signal transmission to the eNB, the UE may perform a random access procedure with the eNB (S203 to S206). In the random access procedure, the UE may transmit a predetermined sequence as a preamble on a physical random access channel (PRACH) (S203 and S205) and may receive a response message to the preamble on a PDCCH and a PDSCH associated with the PDCCH (S204 and S206). In the case of a contention-based RACH, the UE may additionally perform a contention resolution procedure.

After the above procedure, the UE may receive a PDCCH and/or a PDSCH from the eNB (S207) and transmit a physical uplink shared channel (PUSCH) and/or a physical uplink control channel (PUCCH) to the eNB (S208), which is a general DL and UL signal transmission procedure. Particularly, the UE receives downlink control information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL acknowledgment/negative acknowledgment (ACK/NACK) signal, a channel quality indicator (CQI), a precoding matrix index (PMI), a rank indicator (RI), etc. In the 3GPP LTE system, the UE may transmit control information such as a CQI, a PMI, an RI, etc. on a PUSCH and/or a PUCCH.

In the LTE/LTE-A system, a subcarrier spacing for a random access preamble (i.e., RACH preamble) is regulated by 1.25 kHz and 7.5 kHz for preamble formats 0 to 3 and a preamble format 4, respectively (refer to 3GPP TS 36.211).

Figure 2:
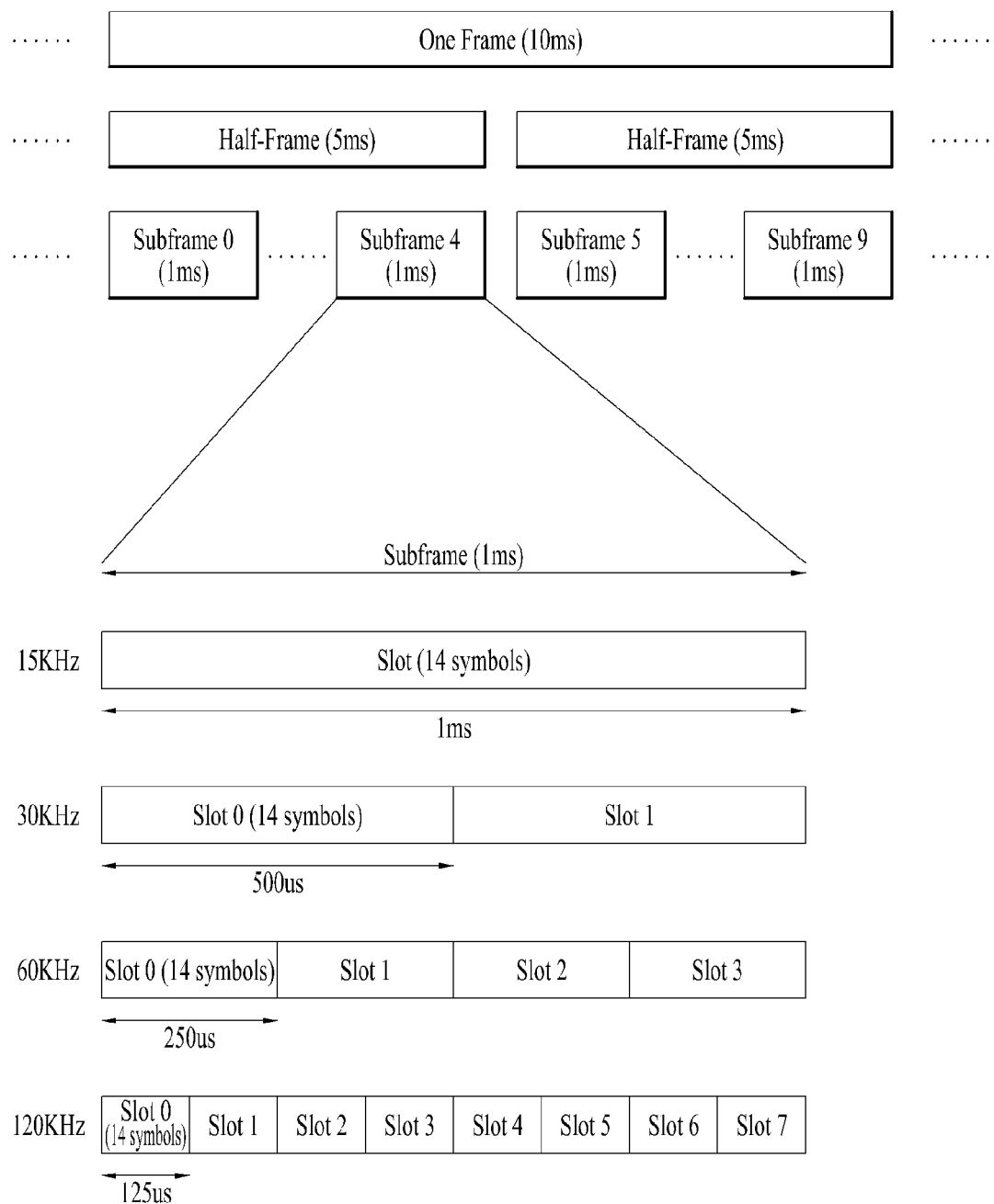
FIG. 2 to 3 are views illustrating structures of a radio frame and slots used in the NR system.

FIG. 2 illustrates an SSB structure. The UE may perform cell search, system information acquisition, beam alignment for initial connection, DL measurement, etc. based on the SSB. The SSB is used interchangeably with the synchronization signal/physical broadcast channel (SS/PBCH) block.

Referring to FIG. 2, an SSB is composed of a PSS, a SSS and a PBCH. The SSB is composed of four consecutive OFDM symbols. The PSS, the PBCH, the SSS/PBCH and the PBCH are transmitted on each OFDM symbol, respectively. The PSS and the SSS are each composed of one OFDM symbol and 127 subcarriers, and the PBCH is composed of 3 OFDM symbols and 576 subcarriers. Polar coding and quadrature phase shift keying (QPSK) are applied to the PBCH. The PBCH is composed of a data RE and a demodulation reference signal (DMRS) RE for each OFDM symbol. There are three DMRS REs per RB, and there are three data REs between the DMRS REs.

The NR system uses an OFDM transmission scheme or a similar transmission system. The new RAT system may conform to OFDM parameters different from the OFDM parameters of LTE. Alternatively, the new RAT system may conform to the numerology of legacy LTE/LTE-A, but have a larger system bandwidth (e.g., 100 MHz). Alternatively, one cell may support a plurality of numerologies. That is, UEs operating with different numerologies may coexist within one cell.

Figure 3:
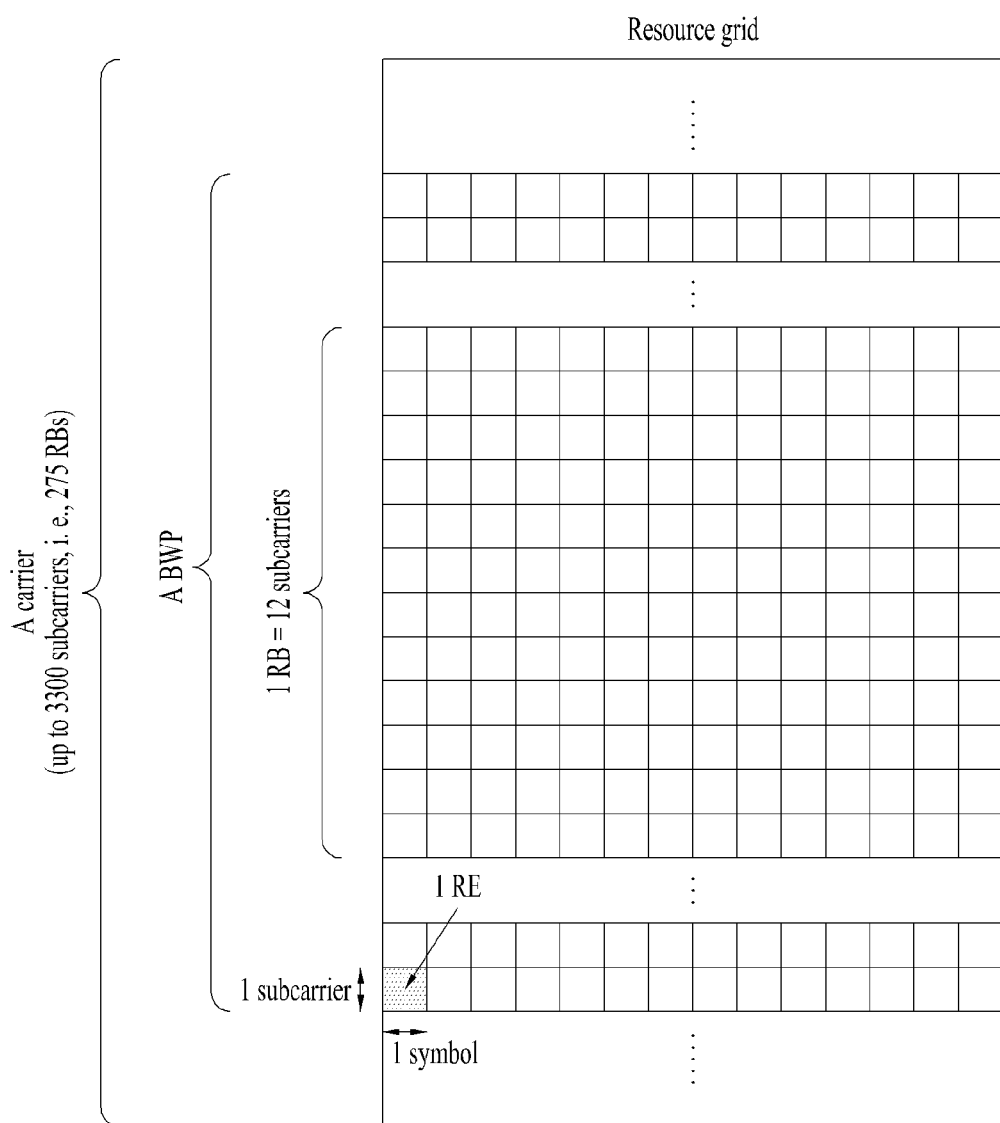

FIG. 3 illustrates a structure of a radio frame used in NR. In NR, UL and DL transmissions are configured in frames. The radio frame has a length of 10 ms and is defined as two 5 ms half-frames (HF). The half-frame is defined as five 1 ms subframes (SF). A subframe is divided into one or more slots, and the number of slots in a subframe depends on subcarrier spacing (SCS). Each slot includes 12 or 14 OFDM(A) symbols according to a cyclic prefix (CP). When a normal CP is used, each slot includes 14 symbols. When an extended CP is used, each slot includes 12 symbols. Here, the symbols may include OFDM symbols (or CP-OFDM symbols) and SC-FDMA symbols (or DFT-s-OFDM symbols).

Table 1 illustrates that the number of symbols per slot, the number of slots per frame, and the number of slots per subframe vary according to the SCS when the normal CP is used.

TABLE 1

| SCS (15*2^u) | $N^{slot}_{symb}$ | $N^{frame,u}_{slot}$ | $N^{subframe,u}_{slot}$ |
|---|---|---|---|
| 15KHz (u = 0) | 14 | 10 | 1 |
| 30KHz (u = 1) | 14 | 20 | 2 |
| 60KHz (u = 2) | 14 | 40 | 4 |
| 120KHz (u = 3) | 14 | 80 | 8 |
| 240KHz (u = 4) | 14 | 160 | 16 |

*$N^{slot}_{symb}$: Number of symbols in a slot
*$N^{frame,u}_{slot}$: Number of slots in a frame
*$N^{subframe,u}_{slot}$: Number of slots in a subframe Table 2 illustrates that the number of symbols per slot, the number of slots per frame, and the number of slots per subframe vary according to the SCS when the extended CP is used.

TABLE 2

| SCS (15*2^u) | $N^{slot}_{symb}$ | $N^{frame,u}_{slot}$ | $N^{subframe,u}_{slot}$ |
|---|---|---|---|
| 60KHz (u = 2) | 12 | 40 | 4 |

In the NR system, the OFDM(A) numerology (e.g., SCS, CP length, etc.) may be configured differently among a plurality of cells merged for one UE. Thus, the (absolute time) duration of a time resource (e.g., SF, slot or TTI) (referred to as a time unit (TU) for simplicity) composed of the same number of symbols may be set differently among the merged cells.

D2D Resource Pool

Figure 4:
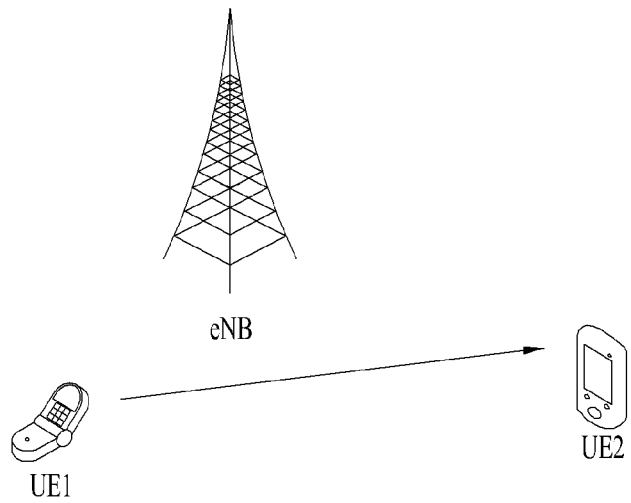
FIG. 4 is a view illustrating an exemplary D2D resource pool for D2D communication.
Figure 4:
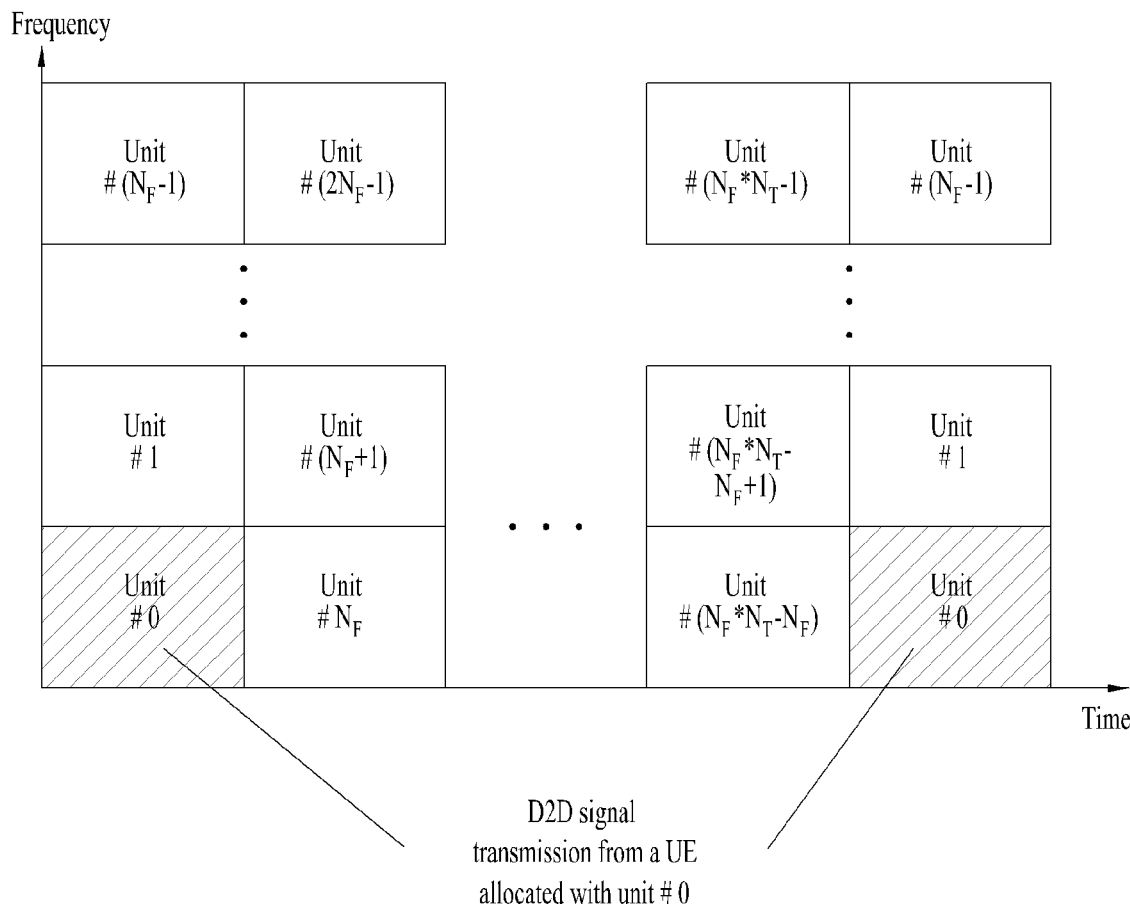

FIG. 4 shows an example of a UE1, a UE2 and a resource pool used by the UE1 and the UE2 performing D2D communication. In FIG. 4(a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. A UE2 corresponding to a reception UE receives a configuration of a resource pool in which the UE1 is able to transmit a signal and detects a signal of the UE1 in the resource pool. In this case, if the UE is located at the inside of coverage of an eNB, the eNB can inform the UE of the resource pool. If the UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 4(b) shows an example of configuring a resource unit. Referring to FIG. 4(b), the entire frequency resources are divided into the $N_F$ number of resource units and the entire time resources are divided into the $N_T$ number of resource units. In particular, it is able to define $N_F*N_T$ number of resource units in total. In particular, a resource pool can be repeated with a period of $N_T$ subframes. Specifically, as shown in FIG. 4, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include a scheduling assignment (SA), a D2D data channel, and a discovery channel. The SA may correspond to a signal including information on a resource position of a D2D data channel, information on a modulation and coding scheme (MCS) necessary for modulating and demodulating a data channel, information on a MIMO transmission scheme, information on a timing advance (TA), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a physical sidelink control channel (PSCCH). The D2D data channel (or, physical sidelink shared channel (PSSCH)) corresponds to a resource pool used by a transmission UE to transmit user data. If an SA and a D2D data are transmitted in a manner of being multiplexed in an identical resource unit, D2D data channel except SA information can be transmitted only in a resource pool for the D2D data channel. In other word, REs, which are used to transmit SA information in a specific resource unit of an SA resource pool, can also be used for transmitting D2D data in a D2D data channel resource pool. The discovery channel may correspond to a resource pool for a message that enables a neighboring UE to discover transmission UE transmitting information such as ID of the UE, and the like.

Although contents of D2D signal are identical to each other, it may use a different resource pool according to a transmission/reception attribute of the D2D signal. For example, in case of the same D2D data channel or the same discovery message, the D2D data channel or the discovery signal can be classified into a different resource pool according to a transmission timing determination scheme (e.g., whether a D2D signal is transmitted at the time of receiving a synchronization reference signal or the timing to which a prescribed timing advance is added) of a D2D signal, a resource allocation scheme (e.g., whether a transmission resource of an individual signal is designated by an eNB or an individual transmission UE selects an individual signal transmission resource from a pool), a signal format (e.g., number of symbols occupied by a D2D signal in a subframe, number of subframes used for transmitting a D2D signal), signal strength from an eNB, strength of transmit power of a D2D UE, and the like. For clarity, a method for an eNB to directly designate a transmission resource of a D2D transmission UE is referred to as a mode 1. If a transmission resource region is configured in advance or an eNB designates the transmission resource region and a UE directly selects a transmission resource from the transmission resource region, it is referred to as a mode 2. In case of performing D2D discovery, if an eNB directly indicates a resource, it is referred to as a type 2. If a UE directly selects a transmission resource from a predetermined resource region or a resource region indicated by the eNB, it is referred to as type 1.

SA Transmission/Reception

A mode-1 UE may transmit an SA (or D2D control signal) and sidelink control information (SCI) in resources configured by an eNB. For a mode-2 UE, the eNB configures resources for D2D communication. The mode-2 UE may select time-frequency resources from the configured resources and transmit an SA in the selected time-frequency resources.

Figure 5:
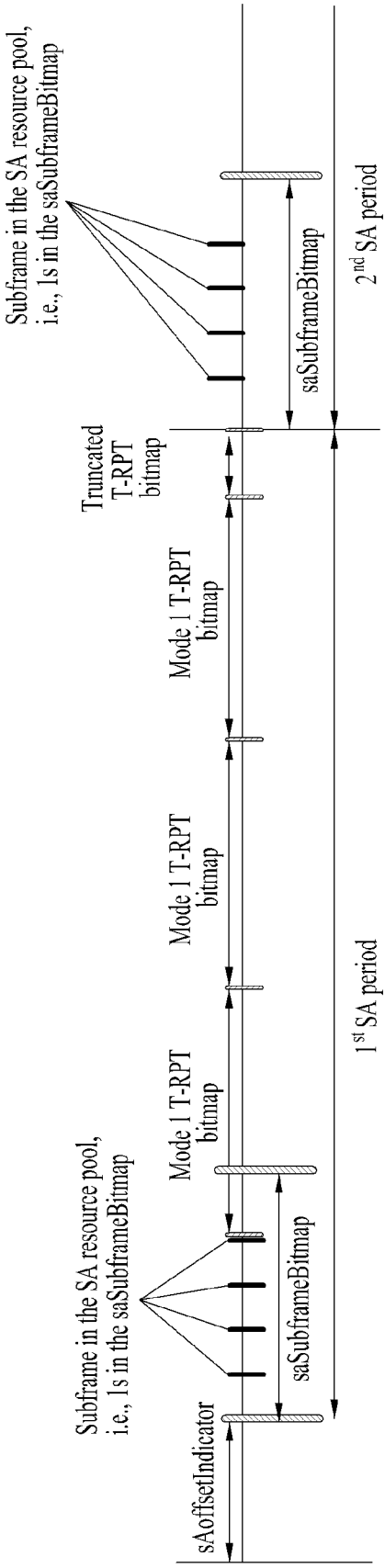
FIG. 5 is a view referred to for describing a scheduling assignment (SA) period.

A SA period may be defined as illustrated in FIG. 5. Referring to FIG. 5, a first SA period may start in a subframe spaced from a specific system frame by a predetermined offset, SAOffsetIndicator indicated by higher-layer signaling. Each SA period may include an SA resource pool and a subframe pool for D2D data transmission. The SA resource pool may include the first subframe of the SA period to the last of subframes indicated as carrying an SA in a subframe bitmap, saSubframeBitmap. The resource pool for D2D data transmission may include subframes used for actual data transmission through application of a time-resource pattern for transmission (T-RPT) or a time-resource pattern (TRP) in mode 1. As illustrated, if the number of subframes included in an SA period except for an SA resource pool is larger than the number of T-RPT bits, the T-RPT may be applied repeatedly, and the last applied T-RPT may be applied truncated by as much as the number of remaining subframes.

Now, a description will be given of methods for acquiring time and frequency synchronization in D2D communication, particularly for communication between vehicles, between a vehicle and another terminal, and between a vehicle and an infrastructure network, based on the above description. The foregoing method related to a D2DSS is characterized in that priority is given to synchronization provided by a network. More specifically, a UE selects an SS transmitted directly by an eNB with a highest priority, in determining its transmission synchronization. If the UE is located outside the coverage of the eNB, the UE is first synchronized with a D2DSS transmitted by a UE within the coverage of the eNB. This operation is intended to bring about the effect of reliable multiplexing between a D2D operation and a legacy network operation (transmission and reception between an eNB and a UE) through synchronization of a UE with a timing provided by the network, if possible (e.g., the legacy network operation is performed in one subframe, and D2D communication is conducted in the next subframe). Meanwhile, a wireless terminal installed in a vehicle or a terminal mounted in a vehicle may not experience a relatively great battery consumption problem, and may use a satellite signal such as a global positioning system (GPS) signal for the purpose of navigation. Accordingly, the satellite signal is available for time or frequency synchronization between terminals. Besides a GPS signal, the satellite signal may be any of a global navigation satellite systems (GNSS) signal, a global navigation satellite system (GLONAS) signal, a GALILEO signal, a BEIDOU signal, and so on. While the following description is given mainly in the context of a GNSS signal and a GPS signal as satellite signals, by way of example, the satellite signals may be replaced with other satellite signals. Further, a vehicle (V)-UE may be a UE moving in a vehicle, and a pedestrian (P)-UE may be a UE moving on foot or on a cycle in the following description. Further, a GPS timing may refer to configuring a frame/subframe boundary based on an absolute time being a time acquired by GPS reception (e.g., a coordinated universal time (UTC) time or a GPS time) and then configuring a part or all of subframes as subframes for D2D signal transmission. A cellular timing means a frame/subframe boundary for a D2D signal, generated based on a time obtained by applying a predetermined offset (e.g., a timing advance) to a reception time of a PSS/SSS or SLSS transmitted by an adjacent eNB or RSU (e.g., an eNB or RSU from which a signal having a largest RSRP is received) or a reception time of a PSS/SSS transmitted by an eNB. A radio frame/subframe boundary may be set by applying a predetermined offset (the offset may be 0 under circumstances) to the PSS/SSS reception time and then some subframes may be configured as D2D subframes. In the following description, SLSS id_net may represent a set of SLSS IDs available for UEs which have selected an SS of an eNB as a synchronization reference, from among physical-layer SLSS IDs {0, 1, . . . , 335}. SLSS id_net may include SLSS IDs {168, 169, . . . , 335}.

Existing Autonomous Vehicle Sensing Technologies

An autonomous vehicle has the capability of sensing its surroundings and then navigating safely without human impact. Autonomous vehicle leverages a variety of vehicle-mounted sensors, such as automotive Radar, camera, LiDAR (short for Light Detection and Ranging), GPS (short for Global Positioning System), to sense and detect the environment, which is a critical function of autonomous deriving. As is well known, all of them have their specific characteristics. The existing key sensing techniques are introduced as follows.

a) Automotive Radar: Automotive radar (H. Meinel and J. Dickmann, "Automotive radar: From its origins to future directions," Microwave J., vol. 56, pp. 24-40, September 2013.) can localize vehicles as well as estimate their velocities via sending a special waveform (e.g., frequency modulated continuous waveform) and analyzing its reflection by the vehicles. Recent breakthroughs in millimeter wave (mm-Wave) radar (J. Choi, V. Va, N. Gonzalez-Prelcic, R. Daniels, C. R. Bhat, and R. Heath, "Millimeter-wave vehicular communication to support massive automotive sensing," IEEE Commun. Mag., vol. 54, pp. 160-167, December 2016.), operating between 76 and 81 GHz frequencies, contributes to the deployment of large-scale but highly impact arrays to achieve a much higher resolution than traditional radar operating at lower frequencies. It works well in hostile weather conditions (e.g., heavy snow, rain, fog) or in an environment with poor lighting.

b) LiDAR and Camera: LiDAR (B. Schwarz, "Lidar: Mapping the world in 3d," Nature Photonics, vol. 4, pp. 429-430, July 2010.) applies narrow laser beams to scan surrounding environment, analyze the backscattered laser signal, and finally generate high resolution three-dimensional (3-D) digital images for safe navigation in dynamic environment. Moreover, the relative distance as well as geometrical shape of nearby vehicles can be detected based on the 3-D map. Camera [I. Skog and P. Handel, "In-car positioning and navigation technologies—a survey," IEEE Trans. Intell. Transp. Syst., vol. 10, pp. 4-21, March 2009.] can capture texture, color, and shape of nearby object by using computer vision techniques.

c) GPS: GPS (Y. Cui and S. Ge, "Autonomous vehicle positioning with GPS in urban canyon environments," IEEE Trans. Robotics and Auto., vol. 19, pp. 15-25, February 2003.) is a network of orbiting satellites that send precise details of vehicles' positioning in space back to earth, which has been widely leveraged in vehicle positioning and navigation.

Drawbacks of Existing Autonomous Vehicle Sensing Technologies

Although the existing autonomous vehicle sensing technologies have been widely used in vehicle positioning and geometry detection, they still have lots of drawbacks which impact the performance of autonomous deriving. The details are shown as follows.

a) Automotive Radar: The main drawback is that radar can incorrectly recognize some harmless small metal object (e.g., a soda can) as a much larger object, leading to false alarms. Moreover, the radar is constrained by line-of-sight (LoS) and cannot see through a larger vehicles such as a truck ahead [6].

b) LiDAR and Camera: LiDAR is constrained by LoS and inefficient under bad weather conditions due to the difficulty of light penetrating fog, snow or rain (L. Kong, M. Khan, F. Wu, G. Chen, and P. Zeng, "Millimeter-wave wireless communications for IoT-cloud supported autonomous vehicles: Overview, design, and challenges," IEEE Comm. Mag., vol. 55, pp. 62-68, January 2017.). In addition, LiDAR is expensive with a typical price from thousands to tens of thousands of dollars and the huge amount of generated data is challenging to be processed within a short time. Typically, camera does not have the intrinsic capabilities of positioning and its drawbacks also include sensitivity to light, weather conditions, and increased computational cost.

c) GPS: Positioning based on stand-alone GPS is vulnerable in the GPS denial environment (or urban canyon environment), where tall buildings block satellite signals and the GPS receiver has to work with a poor geometric constellation of satellites, thereby reducing the accuracy of positioning [I. Skog and P. Handel, "In-car positioning and navigation technologies—a survey," IEEE Trans. Intell. Transp. Syst., vol. 10, pp. 4-21, March 2009.].

Meanwhile, one challenging drawback associated with all existing vehicle sensing and positioning techniques is that they are feasible only for detecting the LoS vehicles but cannot see through a large vehicle (e.g., truck or bus) and detect the hidden/blocked vehicles behind it, which limits the automation capability of vehicles for better safety. Moreover, most of the existing sensing techniques cannot work well under poor weather conditions as well as poor lighting environment.

To fix the critical aforementioned issues, a positioning and geometry detection technique is developed to obtain the information of hidden/blocked vehicles by leveraging NLoS signals from multi-path channels. By using our propose technique, various information of hidden vehicle including the relative distance, the driving direction, the geometrical size and shape, and the driving trajectory is obtained. Moreover, the proposed technique is robust and works well under various challenging scenarios, such as poor weather and poor lighting conditions, insufficient or highly coherent (i.e., correlated scatter) received signals, and noisy signal environment. In summary, the pioneering technology developed here can be fused into and jointly used with all existing vehicle sensing techniques, which will fully unleash the potential of autonomous vehicles and have a huge impact on enhancing the reliability and efficiency of autonomous deriving.

There are two key iterative steps in the proposed technique: 1) signals detection and estimation by using multiple-input multiple-output (MIMO) antenna panels; 2) geometry-based positioning and shape estimation by using the optimization theory. The technical details are listed as follows.

System Model to be Applicable to the Embodiment

A Hidden vehicle is termed as a Transmitter (TX) and the typical vehicle located at the origin is termed as a Receiver (RX). The RX aims at estimating the position and geometry of the TX, which is a primary goal of this work. Multiple MIMO antenna panels are deployed on TX and RX (For example, one possible approach is to deploy antenna at each corner of car roof (see FIG. 6)). For each panel at TX, there are antennas, which are ordered from 1 to (see FIG. 6). The deployment of all MIMO antenna panels is perfectly aligned. It is implicitly assumed that RX know the MIMO panels' geometry of the TX. Any antenna geometry is enabled, e.g., linear, circular, cylinder and sphere. We focus on a single MIMO antenna panel at RX comprising antennas but extension to multiple panels is straightforward.

The same order of antenna at each MIMO antenna panel uses an identical waveform, which is orthogonal to that of another order of antenna (i.e., $M_t$ orthogonal waveforms are required for each vehicle). Let $s_m(t)$ denote the continuous-time baseband waveform assigned to the m-th antenna with bandwidth $B_s$. Then, the transmitted waveform vector is denoted as $s(t)=[s_1(t), \ldots, s_{M_t}(t)]$. Every MIMO panel of TX simultaneously transmits s(t) in a randomly selected instant.

Assume RX knows s(t) as a prior knowledge and keeps checking when s(t) arrives to its MIMO panel.

Transmitted signals are assumed to be reflected by a single scatter. Multi-reflection paths are ignored due to its negligible signal power after severe attenuations. It is possible to filter out the signal by using outlier detection methods (Y. She and A. Owen. "Outlier detection using nonconvex penalized regression," J. American Stati. Association, 106(494):626-639, 2011.).

Assume that the distances between TX, scatters, and RX are much larger than half-wavelength, and plane waves arrive at scatters and the MIMO panel located at RX. The steering vector of TX is represented in terms of angle-of-departure (AoD) $\varphi$ (as $a(\varphi)=[\exp(j2\pi f_c \alpha_1(\varphi)), \ldots, \exp(j2\pi f_c \alpha_{M_t}(\varphi))]^T$, where $f_c$ is the carrier frequency and $\alpha_m(\varphi)$ is the difference of propagation time to the corresponding scatter from the m-th TX antenna than the 1-st TX antenna. Similarly, the steering vector of RX is expressed in terms of angle-of-arrival (AoA) $\theta$ as $b(\theta)=[\exp(j2\pi f_c \beta_1(\theta)), \ldots, \exp(j2\pi f_c \beta_{M_r}(\theta))]^T$ where $\beta_m(\theta)$ refers to the difference of propagation time from the scatter to the m-th RX antenna than the 1-st RX antenna. Define the vector of received signals as $r(t)=[r_1(t), \ldots r_{M_r}(t)]^T$ and hence the received signal vector at the RX is expressed, $$r(t) = \sum_{k=1}^{K}\sum_{\ell=1}^{L^{(k)}} \gamma_\ell^{(k)} b(\theta_\ell^{(k)}) a^T(\varphi_\ell^{(k)}) s(t - \lambda_\ell^{(k)}) + n(t),$$

where $\gamma_l^{(k)}$ and $\lambda_l^{(k)}$ denote the complex channel coefficient and time-of-arrival (ToA) of path l from TX's MIMO panel k, respectively, n(t) is the thermal noise, $L^{(k)}$ represents the number of signal paths originated from MIMO panel k located at TX. Note that $\lambda_l^{(k)}$ is not the same as the corresponding propagation delay, denoted by $\tau_l^{(k)}$, because there exists an unknown synchronization gap between TX and RX denoted by $\Gamma$, i.e., $\tau_l^{(k)} = \lambda_l^{(k)} - \gamma$. Then the propagation distance is calculated $$\tau_\ell^{(k)} = \frac{d_\ell^{(k)}}{c}$$

where c is the speed of light.

Embodiment 1

Figure 9:
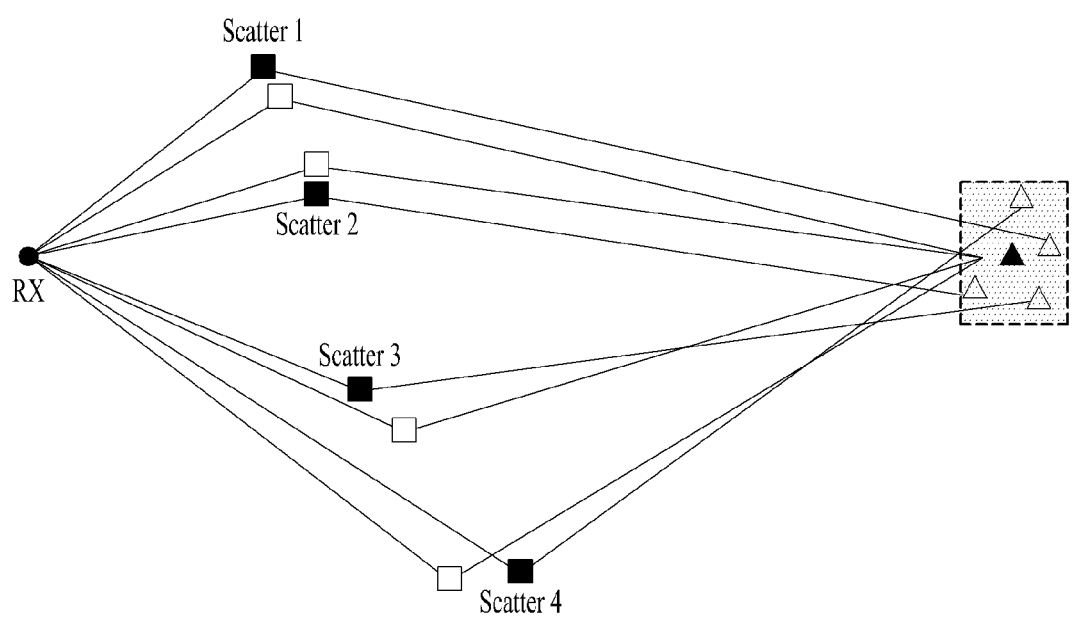
FIG. 9 is positioning Box Minimization

According to a first embodiment, the Rx UE (referred as a sensing vehicle, SV) receives signals of at least 4 paths from the Tx UE (referred as hidden vehicle, HV). The UE may assumes that each of the signals of at least 4 paths was reflected only once due to each scatter of each 4 paths. Each of the signals of at least 4 paths was reflected only once due to each scatter of each 4 paths, as depicted in FIG. 9. The Rx UE may know/acknowledges that the each of the signals of at least 4 paths was reflected only once by measuring the signal strength (i.e., RSSI, RSSP, etc.). In another aspect, the signals of at least 4 paths are selected signals by signal strength measurement. The signals of at least 4 paths are orthogonal each other. The Tx UE transmits its orthogonal waveform in a random timing without synchronization. Specifically, the Tx RE equips multiple antenna clusters, each of which comprises multiple antennas. All clusters transmit the orthogonal waveform simultaneously but the corresponding receiver (Rx UE) does not know this timing.

The Rx UE measure a time of arrival (ToA), an angle of arrival (AoA), an angle of departure (AoD) of each of the signals of 4 paths. The ToA is measured by using a matched filtered, and the AoA and the AoD are measured by using a 2D multiple signal classification (MUSIC) algorithm. The 'signal(s)' mentioned in this document corresponds to at least one of uplink single, downlink signal or sidelink signal, etc.

Figure 7:
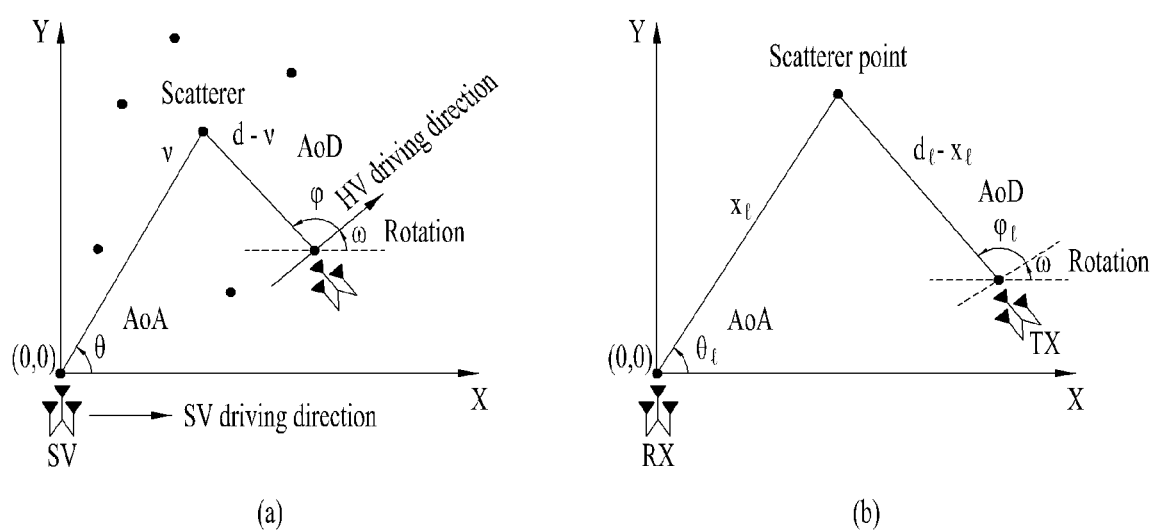
FIG. 7 is 2D signal model

After measurement, the Rx UE determines each distance between the Rx UE and each scatter of each 4 paths, each distance between the Rx UE and the Tx UE and a driving direction of the Tx UE, based on the ToA, AoA and AoD. Referring to FIG. 7, the distance between the Rx UE and the Tx UE is d (or xl), AoA is $\theta_p$ (or $\theta_l$), AoD is $\varphi_p$ ($\varphi_l$). Based on this determination, Rx UE determines a position of the Tx UE based on results of measurement and results of the determination. Here, the position of the Tx UE corresponds to a location in the coordinate. The x-axis of the coordinate corresponds to a driving direction of the Rx UE and the position of the Rx UE is an origin of the coordinate.

For determination of the position, an assumption that each of x-axis distance and y-axis distance between the Tx UE and Rx UE based on the AoA, AoD and the driving direction of the Tx UE are identical in signal path 1 and signal path p (p=2, 3, 4) is used. Further, the distance between the Rx UE and the Tx UE in signal path p is expressed in summation of a distance between the Rx UE and the Tx UE in signal path 1 (d1) and a distance ($c\rho_p$) based on time difference of arrival (TDoA) to reduce unknown variables in the equations generated from the assumption.

Here, the assumption is expressed in following equation A1, $$\begin{cases} x_p = v_p\cos(\theta_p) - (d_p - v_p)\cos(\varphi_p + \omega) = \\ \quad v_1\cos(\theta_1) - (d_1 - v_1)\cos(\varphi_1 + \omega), \\ y_p = v_p\sin(\theta_p) - (d_p - v_p)\sin(\varphi_p + \omega) = \\ \quad v_1\sin(\theta_1) - (d_1 - v_1)\sin(\varphi_1 + \omega) \end{cases}, p \in \mathcal{P}.$$ [Equation A1]

wherein p is path, $\theta_p$ is the AoA, $\varphi_p$ is the AoD, $\lambda_p$ is the ToA, $v_p$ is propagation distances between the Tx UE and the scatter of path p, $d_p$ is a propagation distances between the Tx UE and Rx UE, $\omega$ is driving direction of Tx UE.

The single-bounce scattering is used to model the vehicle-to-vehicle (V2V) propagations that the NLoS signals are assumed to have only once reflection due to scatters. The values of AoA, AoD, and ToD are assumed to be constants (invariant) during the sensing period due to the fact that the channel coherence time is much larger than the waveform duration. When the sequential path combining approach is used, multiple time intervals are considered. We assume the relative orientation of driving direction and velocity of Tx UE with respect to Rx UE remain constant within the entire duration of multiple time intervals.

Hereinafter, more specific explanation for embodiment 1 is provided in the following Embodiment 1-1 and Embodiment 1-2

Embodiment 1-1

AoA/AoD/ToA Estimation

Sampling: The received analog signal r(t) and the waveform vector s(t) are sampled at the 2Nyquist rate $B_s$ and converted to the digital signal vectors r[n] and s[n] respectively.

ToA estimation via Matched filter: The sequence of r[n] is matched-filtered by s[n]. The resultant $M_r \times M_t$ coefficient matrix y[z] is given by $$y[z] = \sum_n r[n]s^*[n-z].$$

Then, the sequence of ToAs $\{\lambda_l\}$ can be estimated by detecting peak points of the norm of y[z], denoted by $\{z_i\}$ that can be converted into time by multiplying the time resolution $$\frac{1}{B_s}.$$

Estimations of AoA, AoD: Given $\{y[z_i]\}$, AoAs and AoDs are jointly estimated using the 2D multiple signal classification (MUSIC) algorithm (K. Wong and M. Zoltowski, "Self-initiating MUSIC-based direction finding and polarization estimation in spatio polarizational beamspace," IEEE Trans. Antennas Propag., vol. 48, no. 8, pp. 1235-1245, August 2000.).

Geometry-Based Positioning and Shape Estimation

Consider the 2D signal model (see FIG. 7). Each NLoS signal path can be characterized by the following five parameters: AoA at the RX denoted by θ; AoD at the TX denoted by φ; the rotation of the TX's driving direction denoted by ω; and the propagation distance denoted by d; which includes the propagation distance before refection, denoted by v; and the remaining distance d−v. The AoD and AoA are defined as azimuth angles relative to driving directions of TX and RX, respectively. The coordinates of TX's MIMO panel k are denoted as $p^{(k)}=(x^{(k)}, y^{(k)})^T$, $x^{(k)}=v_l \cos(\theta_l)-(d_l-v_l)\cos(\varphi_l+\omega)$ and $y^{(k)}=v_l \sin(\theta_l)-(d_l-v_l)\sin(\varphi_l+\omega)$ where $l \in \{1,2,\ldots,L^{(k)}\}$. By using the geometrical relationship that all signals received at RX must originate from a common location, the following system of equations P1 is made:

$$v_i^{(k)}(k)\cos(\theta_i^{(k)})-(d_i^{(k)}-v_i^{(k)})\cos(\varphi_i^{(k)}+\omega)=$$
$$v_l^{(k)}\cos(\theta_l^{(k)})-(d_l^{(k)}-v_l^{(k)})\cos(\varphi_l^{(k)}+\omega)$$

$$v_i^{(k)}(k)\sin(\theta_i^{(k)})-(d_i^{(k)}-v_i^{(k)})\sin(\varphi_i^{(k)}+\omega)=$$
$$v_l^{(k)}\sin(\theta_l^{(k)})-(d_l^{(k)}-v_l^{(k)})\sin(\varphi_l^{(k)}+\omega)$$

The number of equation P1 is $2(L^{(k)}-1)$, and the above system of equations has a unique solution when the dimensions of unknown variables are less than $2(L^{(k)}-1)$. Recalling that after the Step 2 above, AoA, AoD, and ToA of TX can be obtained, the number of unknown variables is $2L^{(k)}+1$ including the propagation distances $\{d_l^{(k)}\}$, the distances from TX to the corresponding scatters $\{v_l^{k)}\}$, and the rotation of driving direction between TX and RX ω.

To reduce the dimensions of unknowns, we use the propagation time difference between signal paths, i.e., time-difference-of-arrival (TDoA), denoted by $\rho_l^{(k)}$, which can be obtained from the difference of ToAs as $\rho_l^{(k)}=\lambda_l^{(k)}-\lambda_1^{(k)}$ where $\rho_1^{(k)}=0$ The propagation distance $d_l^{(k)}$, is then expressed in terms of $d_1^{(k)}$ and $\rho_l^{(k)}$ such that $$d_l^{(k)}=c\cdot(\lambda_l^{(k)}-\Gamma)=c(\lambda_1^{(k)}-\Gamma)+c(\lambda_l^{(k)}-\lambda_1^{(k)})=$$
$$d_1^{(k)}+c\cdot\rho_l^{(k)},$$

Figure 8:
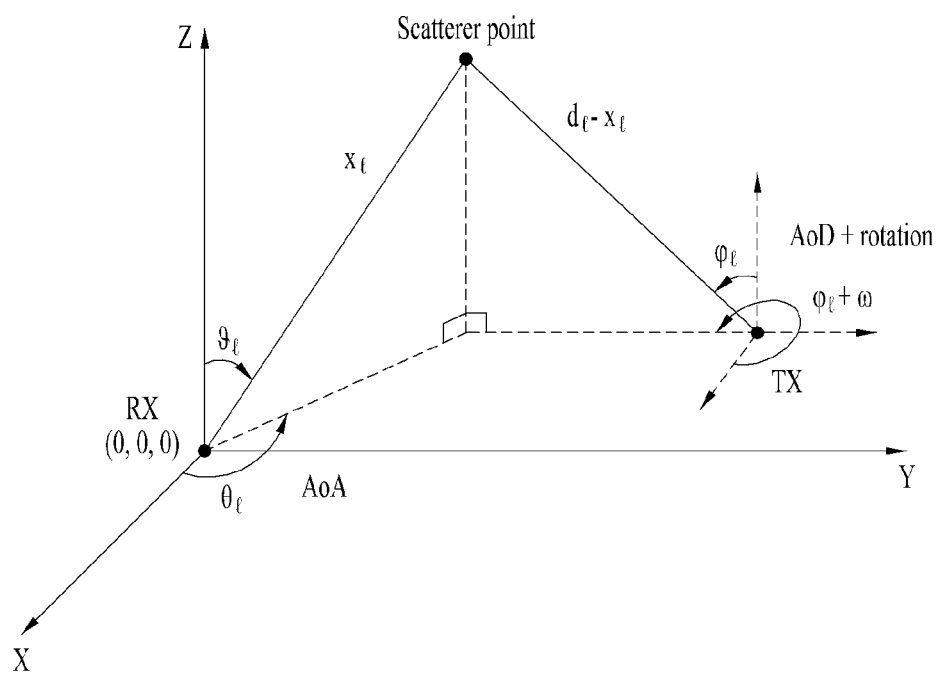
FIG. 8 is 3D signal model

The above condition makes the dimensions of unknowns reduced from $2L^{(k)}+1$ to $L^{(k)}+2$ by replacing $\{d_l^{(k)}\}$ to the equations that are function of $d_1^{(k)}$. As a result, P1 has a unique solution when $2(L^{(k)}-1) \geq L^{(k)}+2$. In other words, if at least 4 paths of information are given, a unique positioning is possible. Extension to 3D signal model (see FIG. 8) is straightforward by adding elevation angles of AoA and AoD.

Vehicle positioning when K=1: Given the above TDoA/AoA/AoD information, we can obtain positioning of the vehicle by using the following two-stage approach.

Stage 1. (Solving the system of linear equations) First given the rotation value ω, the system of linear equation in P1 can be solved by using well known least square (LS) estimator. The corresponding results are denoted by d*(ω*) and v*(ω).

Stage 2. (Optimal rotation value) By one-dimension search of ω over [0,2π), we find out the optimal ω* and the corresponding d*(ω*) and v*(ω*) by choosing minimum the least square.

It is worth noting that the LS estimator can solve P1 accurately even with the estimation errors on AoA and AoD because the LS estimator tries to cancel out these errors to minimize the L2-norm of system of linear equations. In addition, It is well known by Stein's phenomenon such that LS can give near-optimal solution when more than three parameters are jointly estimated as in P1.

Positioning and Shape Detection when K>1: Consider multiple MIMO panels at TX. We aim at detecting not only TX's position but also its shape inferred from multiple panels' locations. Note that the above LS estimator is not suitable in this case because they are physically separated and their distances are unknown, making it impossible to formulate the system of linear equations as P1. Instead, we can use the alternative approach for Stage 1 called positioning box minimization (See FIG. 9). Let X and Y be the width and length of the positioning box, respectively. The objective is to minimize the size of the positioning box under the following constraints. The maximal x-axis and y-axis distance differences of any pair of estimates of two signal paths, denoted by $\max_{i,l \in L}(x_i-x_l)$ and $\max_{i,l \in L}(y_i-y_l)$ should not be larger than X and Y (see FIG. 5), respectively. Here, the superscript (k) is removed because RX cannot know the MIMO panel the corresponding signal path comes from. Given the above constraints, we aim at minimizing minimizing its diagonal length $l=\sqrt{X^2+Y^2}$, which is the same as minimizing $l^2=X^2+Y^2$. As a result, given the rotation w and let $v(\omega)=\{v_1(\omega), \ldots, v_L(\omega)\}$ the position estimation problem is formulated as follows.

$$\{v^*(\omega^*), d_1^*(\omega^*)\} = \mathrm{argmin}_{\{v(\omega),d_1(\omega),X,Y\}} X^2 + Y^2 \quad \text{[Equation P2]}$$

$$\text{s.t., } \max_{i,l \in L}(x_i-x_l) \leq X, \ \max_{i,l \in L}(y_i-y_l) \leq Y,$$

$$0 < v_p < d_1 + c\rho_p, \forall p \in L,$$

Where the second constraints represents that the propagation distance before reflection $v_l$ should be smaller than the total distance $d_l$ and larger than zero.

After solving P2 and finding the optimal rotation ω* via 1D search in Stage 2, The starting point of each signal is obtained. To calculate the locations of MIMO panels, the following clustering procedure can be added Stage 3. (Clustering) Estimated points of signals are clustered to obtain each MIMO panel position by jointly using K-means clustering. The K-means clustering is one widely used cluster analysis in data mining with the goal that partitions received signals into K clusters and minimize the sum of squared distances of each estimate to its center point (J. Hartigan and M. Wong, "Algorithm AS 136: A k-means clustering algorithm," J. Royal Stati. Society. Series C, vol. 28,). By applying the K-means clustering, a set of K points can be found to act as center points and then map them to MIMO panels' locations (see FIG. 10). If the exact number of MIMO panels is unknown, the DBSCAN algorithm can be used to do the clustering and positioning (J. Sander, M. Ester, H.-P. Kriegel, and X. Xu, "Density-based clustering in spatial databases: The algorithm gdbscan and its applications," Data mining and knowledge discovery, vol. 2, no. 2, pp. 169-194, 1998.)

Note that the proposed technique is operated based on the assumption that sufficient number of signal paths is guaranteed. However, in some case of insufficient number of paths, e.g., less scattering points or Line-of-Sight (LoS) channel status. To address this issue, the following approaches are introduced.

Directional beamforming at TX: In case of less scatters, the scattering points of different MIMO panels are correlated, making it difficult to obtain the accurate AoA and AoD detection. To avoid it, TX can use directional beamforming, allowing each MIMO panel to experience different scattering points (See FIG. 6)

Beam Sweeping at TX: The MIMO panels at TX randomly or with predetermined manner switch their beamdirections to make multipath environments and avoid maintaining insufficient number of signal paths.

Figure 12:
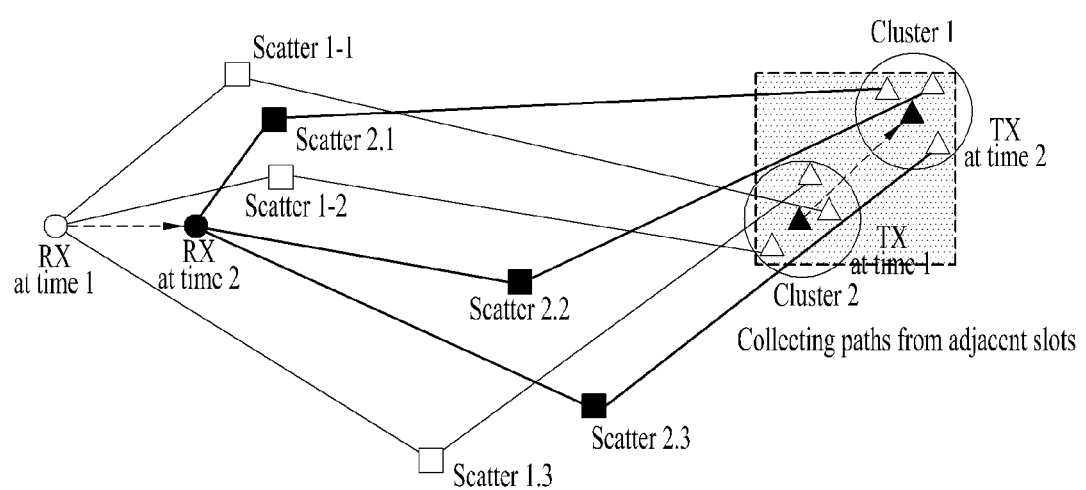
FIG. 12 is sequential approach in case of insufficient paths

Sequential combining at RX: Consider the periodical transmission of positioning signal with predetermined interval. The RX enables to combine the received signals sequentially and perform positioning via the above the case of K>1 shown in FIG. 12, assuming that their moving directions are not changed.

Embodiment 1-2

System Model

Figure 6:
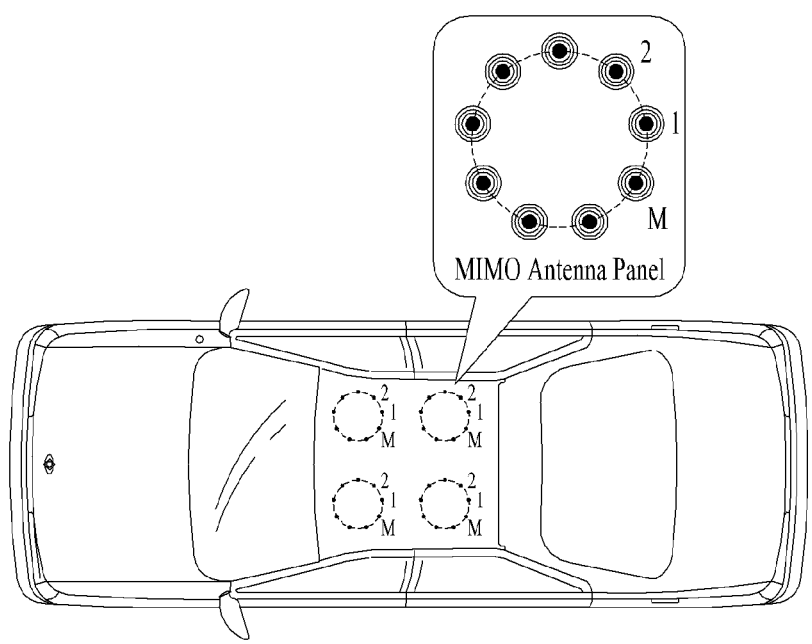
FIG. 6 is Graphical example of MIMO panel deployment

We consider a two-vehicle system where a sensing vehicle (SV) attempts to detect the position, shape, and orientation of a hidden vehicle (HV) blocked by obstacles such as trucks or buildings (see FIG. 6). For the task of only detecting the position and orientation (see Section 3), it is sufficient for HV to have an array of collocated antennas (with negligible half-wavelength spacing). On the other hand, for the task of simultaneous detection of position, shape, and orientation (see Section 4), the antennas at the HV are assumed to be distributed as multiple clusters of collocated antennas over HV body. For simplicity, we consider 4-cluster arrays with clusters at the vertices of a rectangle. Then sensing reduces to detect the positions and shape of the rectangle, thereby also yields the orientation of HV. The relevant technique can be easily extended to a general arrays topology. Last, the SV is provisioned with a 1-cluster array.

Multi-Path NLoS Channel

The channel between the SV and HV contains NLoS and multi-paths reflected by a set of scatterers. Following the typical assumption for V2V channels, only the received signal from paths with single-reflections is considered at the SV while higher order reflections are neglected due to severe attenuation [1]. Propagation is assumed to be constrained within the horizontal plane to simplify exposition. Consider a 2D Cartesian coordinate system where the SV array is located at the origin and the X-axis is aligned with the orientation of SV. Consider a typical 1-cluster array at the HV. Each NLoS signal path from the HV antenna cluster to the SV array is characterized by the following five parameters (see FIG. 7): the AoA at the SV denoted by $\theta$; the AoD at the HV denoted by $\varphi$; the rotation of the HV's driving direction denoted by $\omega$; and the propagation distance denoted by d which includes the propagation distance before refection, denoted by v, and the remaining distanced d−v. The AoD and AoA are defined as azimuth angles relative to driving directions of HV and SV, respectively.

Hidden Vehicle Transmission

Each of 4-cluster arrays of HV hidden vehicle has $M_t$ antennas. The HV is assigned four sets of $M_t$ orthogonal waveforms for transmission. Each set is transmitted using a corresponding antennas cluster where each antenna transmits an orthogonal waveform. It is assumed that by network coordinated waveform assignment, HV waveform sets are known at the SV that can hence group the signal paths according their originating antennas clusters arrays. Let $s_m(t)$ be the continuous-time baseband waveform assigned to the m-th HV antenna with the bandwidth $B_2$. Then the waveform orthogonality is specified by $\int s_{m_1}(t) s_{m_2}^*(t) dt = \delta(m_1 - m_2)$ with the delta function $\delta(x)=1$ if $x=0$ and 0 otherwise. The transmitted waveform vector for the k-th array of HV antennas cluster is $s^{(k)}(t)=[s_1^{(k)}(t), \ldots, s_{M_t}^{(k)}(t)]^T$. With the knowledge of, the SV with antennas scans and retrieves the receive signal due to the HV transmission.

Consider a typical HV antennas cluster array. Based on the far-field propagation model (K. Jo, K. Chu, and M. Sunwoo, "Interacting multiple model filter-based sensor fusion of gps with in-vehicle sensors for real-time vehicle positioning," IEEE Trans. Intell. Transp. Syst., vol. 13, pp. 329-343, March 2012.), the cluster response vector is represented as a function of AoD $\varphi$ as Equation 1, $$a(\varphi)=[\exp(j2\pi f_o \alpha_1(\varphi)), \ldots \exp(j2\pi f_c \alpha_{M_t}(\varphi))]^T, \quad \text{[Equation 1]}$$

where $f_c$ denotes the carrier frequency and $\alpha_m(\varphi)$ refers to the difference in propagation time to the corresponding scatterer between the m-th HV antenna and the 1-st HV antenna in the same cluster, i.e., $\alpha_1(\varphi)=0$. Similarly, the response vector of SV array is expressed in terms of AoA $\theta$ as Equation 2, $$b(\theta)=[\exp(j2\pi f_c \beta_1(\theta)), \ldots, \exp(j2\pi f_c \beta_{M_r}(\theta))]^T \quad \text{[Equation 2]},$$

where $\beta_m(\theta)$ refers to the difference of propagation time from the scatterer to the m-th SV antenna than the 1-st SV antenna. We assume that SV has prior knowledge of the response functions $a(\varphi)$ and $b(\theta)$. This is feasible by standardizing the vehicular arrays' topology. In addition, the Doppler effect is ignored based on the assumption that the Doppler frequency shift is much smaller than the waveform bandwidth and thus does not affect waveform orthogonality.

Let $1 \leq k \leq 4$ with denote the index of HV arrays and $p^{(k)}$ denote the number of received paths originating from the k-th antennas cluster array. The total number of paths arriving at SV is $$P = \sum_{k=1}^{4} P^{(k)}.$$

Represent the received signal vector at SV as $r(t)=[r_1(t), \ldots r_{M_r}(t)]^T$. It can be expressed in terms of $s(t)$, $a(\varphi)$, and $b(\theta)$ as $$r(t) = \sum_{k=1}^{4} \sum_{p=1}^{P^{(k)}} \gamma_p^{(k)} b(\theta_p^{(k)}) a^T(\varphi_p^{(k)}) s(t - \lambda_p^{(k)}) + n(t),$$

where $\gamma_p^{(k)}$ and $\lambda_p^{(k)}$ respectively denote the complex channel coefficient and ToA of path p originating from the k-th HV array, and n(t) represents channel noise. Without synchronization between HV and SV, SV has no information of HV's transmission timing. Therefore, $\lambda_p^{(k)}$ differs from the corresponding propagation delay, denoted by $\tau_p^{(k)}$, due unknown clock synchronization gap between HV and SV denoted by $\Gamma$. Consequently, $\tau_p^{(k)} = \lambda_p^{(k)} - \Gamma$.

Estimations of AoA, AoD, and ToA

The sensing techniques in the sequel assume that the SV has the knowledge of AoA, AoD, and ToA of each receive NLoS signal path, say path p, denoted by $\Phi_p = (\theta_p, \varphi_p, \lambda_p)$ where $p \in \{1, 2, \ldots, P\}$. The knowledge can be acquired by applying classical parametric estimation techniques briefly sketched as follows. The estimation procedure comprises the following three steps.

1) Sampling: The received analog signal r(t) and the waveform vector s(t) are sampled at the Nyquist rate $B_s$ to give discrete-time signal vectors r[n] and s[n], respectively.

2) Matched filtering: The sequence of r[n] is matched-filtered using s[n]. The resultant $M_r \times M_t$ coefficient matrix y[z] is given by $$y[z] = \sum_n r[n] s^*[n - z].$$

The sequence of ToAs $\{\lambda_p\}$ can be estimated by detecting peaks of the norm of y[z], denoted by $\{z_i\}$, which can be converted into time by multiplying the time resolution $$\frac{1}{B_s}.$$

3) Estimations of AoA/AoD: Given $\{y[z_i]\}$ AoAs and AoDs are jointly estimated using a 2D-multiple signal classification (MUSIC) algorithm (B. Schwarz, "Lidar: Mapping the world in 3d," Nature Photonics, vol. 4, pp. 429-430, July 2010.). The estimated AoA $\theta_p$, AoD $\varphi_p$, ToA $\lambda_p$ jointly characterize the p-th NLoS path.

Hidden Vehicle Sensing Problem

The SV attempts to sense the HV's position, shape, and orientation. The position and shape of HV can be obtained by using parameters of AoA $\theta$, AoD $\varphi$, orientation $\omega$, distances d and v, length and width of configuration of 4-cluster arrays denoted by L and W, respectively. Noting the first two parameters are obtained based on the estimations in Section 2.3 and the goal is to estimate the remaining five parameters.

Sensing Hidden Vehicles with Colocated Antennas

Consider the case that the HV has an array with colocated antennas (1-cluster array). SV is capable of detecting the HV position, specified by the coordinate p=(x,y), and orientation, specified $\omega$ in FIG. 7. The prior knowledge that the SV has for sensing is the parameters of NLoS paths estimated as described in Section 2.3. Each path, say path p, is characterized by the parametric set $\{\theta_p, \varphi_p, \lambda_p\}$. Then the sensing problem in the current case can be represented as Equation 3, $$\cup_{p \in \mathcal{P}} \{\theta_p, \varphi_p, \lambda_p\} \Rightarrow \{p, \omega\} \quad \text{[Equation 3]}$$

The problem is solved in the following subsections.

Sensing Feasibility Condition

In this subsection, it is shown that for the sensing to be feasible, there should exist at least four NLoS paths. To this end, based on the path geometry (see FIG. 7), we can obtain the following system of equations:

$$\begin{cases} x_p = v_p \cos(\theta_p) - (d_p - v_p)\cos(\varphi_p + \omega) = \\ \quad v_1 \cos(\theta_1) - (d_1 - v_1)\cos(\varphi_1 + \omega), \\ y_p = v_p \sin(\theta_p) - (d_p - v_p)\sin(\varphi_p + \omega) = \\ \quad v_1 \sin(\theta_1) - (d_1 - v_1)\sin(\varphi_1 + \omega) \end{cases}, p \in \mathcal{P}.$$

The number of equations in P1 is 2(P-1) and the above system of equations has a unique solution when the dimensions of unknown variables are less than 2(P-1). Since the AoAs $\{\theta_p\}$ and AoDs $\{\varphi_p\}$ are known, the number of unknowns is (2P+1) including the propagation distances $\{d_p\}$, and $\{v_p\}$ orientation $\omega$. To further reduce the number of unknowns, we use the propagation time difference between signal paths also known as TDoAs, denoted by $\{\rho_p\}$, which can be obtained from the difference of ToAs as $\rho_p = \lambda_p - \lambda_1$ where $\rho_1 = 0$. The propagation distance of signal path p, say $d_p$, is then expressed in terms of $d_1$ and $\rho_p$ as Equation 4, $$d_p = c(\lambda_p - \Gamma) = c(\lambda_1 - \Gamma) + c(\lambda_p - \lambda_1) = d_1 + c\rho_p. \quad \text{[Equation 4]}$$

for p={2, …, P}. Substituting the above (P-1) equations into P1 eliminates the unknowns $\{d_2, \ldots d_p\}$ (and hence reduces the number of unknowns from (2P+1) to (P+2). As a result, P1 has a unique solution when 2(P-1)≥P+2.

$$\begin{cases} v_p \cos(\theta_p) - (d_1 + c\rho_p - v_p)\cos(\varphi_p + \omega) = \\ \quad v_1 \cos(\theta_1) - (d_1 - v_1)\cos(\varphi_1 + \omega), \\ y_p = v_p \sin(\theta_p) - (d_p - v_p)\sin(\varphi_p + \omega) = \\ \quad v_1 \sin(\theta_1) - (d_1 - v_1)\sin(\varphi_1 + \omega) \end{cases}, p \in \mathcal{P}.$$

Proposition 1 (Sensing feasibility condition) To sense the position and orientation of a HV with 1-cluster array, at least four NLoS signal paths are required:

Remark 1 (Asynchronization and TDoA) Recall that one sensing challenge is asynchronization between HV and SV represented by $\Gamma$, which is a latent variable we cannot observe explicitly. Considering TDoA helps solve the problem by avoiding the need of considering $\Gamma$ by exploiting the fact that all NLoS paths experience the same synchronization gap.

Hidden Vehicle Sensing without Noise

Consider the case of a high receive signal-to-noise ratio (SNR) where noise can be neglected. Then the sensing problem in (3) is translated to solve the system of equations in P1. One challenge is that the unknown orientation introduces nonlinear relations, namely $\cos(\varphi_p + \omega)$ and $\sin(\varphi_p + \omega)$, in the equations. To overcome the difficulty, we adopt the following two-step approach: 1) Estimate the correct orientation $\omega^*$ via its discriminant introduced in the sequel; 2) Given $\omega^*$, the equations becomes linear and thus can be solved via least-square (LS) estimator, giving the position $p^*$. To this end, the equations in P1 can be arranged in a matrix form as $$A(\omega)z = B(\omega) \quad \text{(P2)}$$

where $z = (v, d_1)^T$ and $v = \{v_1, \ldots, v_p\}$ For matrix $A(\omega)$, $$A(\omega) = \begin{bmatrix} A^{(\cos)}(\omega) \\ A^{(\sin)}(\omega) \end{bmatrix} \in \mathbb{R}^{2(P-1) \times (P+1)}, \quad \text{Equation 5}$$

where A(cos)(ω) is Equation 6, $$A^{(cos)}(\omega) = \begin{bmatrix} a_1^{(cos)} & -a_2^{(cos)} & 0 & \cdots & 0 & a_{1,2}^{(cos)} \\ a_1^{(cos)} & 0 & -a_3^{(cos)} & \cdots & 0 & a_{1,3}^{(cos)} \\ \vdots & \vdots & \vdots & \ddots & \vdots & \vdots \\ a_1^{(cos)} & 0 & 0 & \cdots & -a_P^{(cos)} & a_{1,P}^{(cos)} \end{bmatrix} \quad [\text{Equation 6}]$$

with $a_p^{(cos)} = \cos(\theta_p) + \cos(\varphi_p + \omega)$ and $a_{1,p}^{(cos)} = \cos(\varphi_p + \omega) - \cos(\varphi_1 + \omega)$ where $p \in \mathcal{P}$, and $A^{(sin)}(\omega)$ is obtained by replacing all cos operations in $A^{(cos)}(\omega)$ with sin operations. Next, $$B^{(cos)}(\omega) = \begin{bmatrix} c\rho_2 \cos(\varphi_2 + \omega) \\ c\rho_3 \cos(\varphi_3 + \omega) \\ \vdots \\ c\rho_P \cos(\varphi_P + \omega) \end{bmatrix}, \quad [\text{Equation 8}]$$

and $B^{(sin)}(\omega)$ is obtained by replacing all cosine operations in $B^{(cos)}(\omega)$ with sin operations.

1) Computing: Note that P2 becomes an over-determined linear system of equations if F≥4 (see Proposition 1), providing the following discriminant of orientation ω. Since the equations in Equation 5 are based on the geometry of multi-path propagation and HV orientation as illustrated in FIG. 7, there exists a unique solution for the equations. Then we can obtain from Equation 5 the following result useful for computing ω*.

Proposition 2 (Discriminant of orientation) With P≥4, a unique ω* exists when B(ω*) is orthogonal to the null column space of A(ω*) denoted by null $(A(\omega^*)^T \in \mathbb{R}^{2(P-1) \cdot (P-3)}$:

$$\text{null}(A(\omega^*)^T)^T B(\omega^*) = 0 \quad [\text{Equation 9}]$$

Given this discriminant, a simple 1D search can be performed over the range [0,2π] to find ω*.

2) Computing: Given the, P2 can be solved by Equation 10, $$z^* = A(\omega^*)^T A(\omega^*))^{-1} A(\omega^*)^T B(\omega^*) \quad [\text{Equation 10}]$$

Then the estimated HV position p* can be computed by substituting Equation 9 and Equation 10 into Equation 4 and P1.

Hidden Vehicle Sensing with Noise

In the presence of significant channel noise, the estimated AoAs/AoDs/ToAs contain errors. Consequently, HV sensing is based on the noisy versions of matrix A(ω) and B(ω), denoted by Ã(ω) and B̃(ω), which do not satisfy the equations in P2 and Equation 9. To overcome the difficulty, we develop a sensing technique by converting the equations into minimization problems whose solutions are robust against noise.

1) Computing ω*: Based on Equation 9, we formulate the following problem for finding the orientation ω:

$$\omega^* = \underset{\omega}{\text{argmin}} \left[ \text{null}(\tilde{A}(\omega)^T)^T \tilde{B}(\omega) \right]. \quad [\text{Equation 11}]$$

Solving the problem relies on a 1D search over [0,2π].

2) Computing: Next, given ω*, the optimal z* can be derived by using the LS estimator that minimizes the squared Euclidean distance as Equation 12, $$z^* = \underset{z}{\text{argmin}} \left\| \tilde{A}(\omega^*) z - \tilde{B}(\omega^*) \right\|^2 = \left[ \tilde{A}(\omega^*)^T \tilde{A}(\omega^*) \right]^{-1} \tilde{A}(\omega^*)^T \tilde{B} \quad [\text{Equation 12}]$$

which has the same structure as Equation 10. Last, the origins of all paths $\{(x_p, y_p)\}_{p \in \mathcal{P}}$ can be computed using the parameters {z*,ω*} as illustrated in P1. Averaging these origins gives the estimate of the HV position p*=(x*,y*) with $$x^* = \frac{1}{P} \sum_{p=1}^{P} x_p \text{ and } y^* = \frac{1}{P} \sum_{p=1}^{P} y_p.$$

Extension to 3D Propagation

Figure 13:
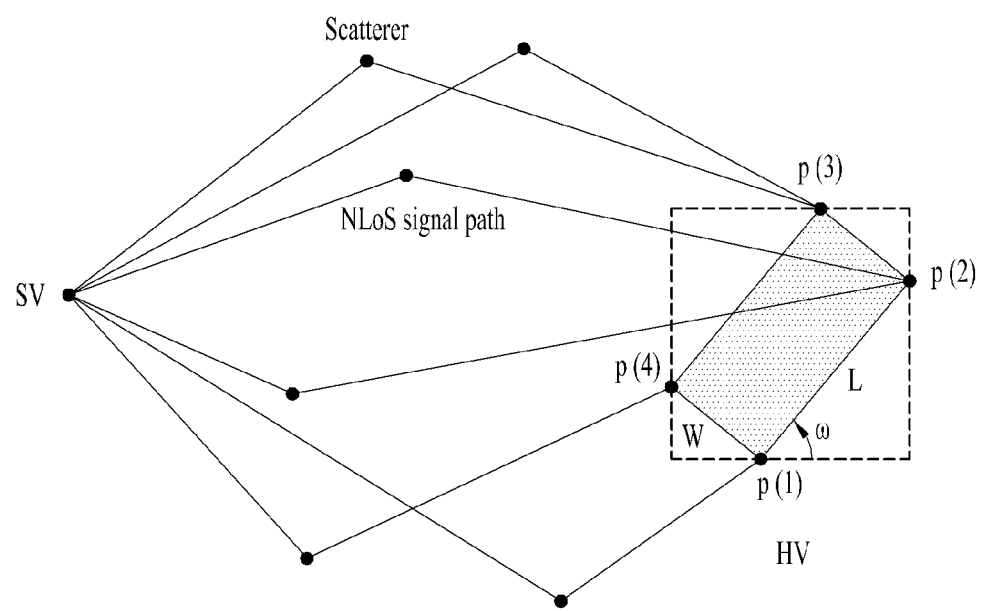
FIG. 13 is rectangular configuration of -cluster arrays at HV.

Consider the scenario that propagation paths lie in the 3D Euclidean space instead of the 2D plane previously assumed. As shown in FIG. 13, the main differences from the 2D scenario are that the elevation angles are added to the AoA, AoD, and HV orientation. Specially, the AoA includes two angles: θ (azimuth) and ϑ (elevation) and AoD consists φ (azimuth) and ψ (elevation). The estimation of AoAs and AoDs in the 3D model can be jointly estimated via various approaches, e.g., MUSIC algorithm for 3D signal detection [see e.g., [23]]. The HV orientation also includes two unknowns: ω (azimuth) and ε (elevation). The coordinates of HV, denoted by p={x,y,z}, are given as $$x - v_p \sin(\theta_p)\cos(\theta_p) - (d_p - v_p)\sin(\psi_p - \varrho)\cos(\varphi_p + \omega)$$

$$\{y = v_p \sin(\vartheta_p)\sin(\theta_p) - (d_p - v_p)\sin(\psi_p + \varrho)\sin(\varphi_p + \omega),$$

$$z = v_p \cos(\varepsilon_p) - (d_p - v_p)\cos(\psi_p + \varrho),$$

Then, similar to E1, the following system of equations is constructed for 3D propagation:

[Equation E3]

$$v_p \sin(\vartheta_p)\cos(\theta_p) - (d_p - v_p)\sin(\psi_p + \varrho)\cos(\varphi_p + \omega) =$$
$$v_1 \sin(\vartheta_1)\cos(\theta_1) - (d_1 - v_1)\sin(\psi_1 + \varrho)\cos(\varphi_1 + \omega),$$

$$\begin{cases} v_p \sin(\vartheta_p)\sin(\theta_p) - (d_p - v_p)\sin(\psi_p + \varrho)\sin(\varphi_p + \omega) = \\ v_1 \sin(\vartheta_1)\sin(\theta_1) - (d_1 - v_1)\sin(\psi_1 + \varrho)\sin(\varphi_1 + \omega) \end{cases}, \forall p \in \mathcal{P}$$

$$v_p \cos(\vartheta_p) - (d_p - v_p)\cos(\psi_p + \varrho) = v_1 \cos(\vartheta_1) - (d_1 - v_1)\cos(\psi_1 + \varrho).$$

It is shown that the number of equations and the number of unknown variables are 3(P−1) and (P+3), respectively. For the sensing problem to be solvable, we require 3(P−1) ≥P+3, which leads to the following proposition.

Proposition 3 (Sensing Feasibility Condition for 3D) Consider the 3D propagation model. To sense the position and orientation of a HV provisioned with a single-cluster array, at least three NLoS signal paths are required, i.e., P≥3.

Compared with 2D propagation, the minimal number of required signal paths is reduced because extra information can be extracted from one additional dimension (i.e., elevation-angle information of AoA, AoD) of each signal path. A similar methodology described in Sections 3.2 and 3.3 can be easily modified for 3D propagation by applying a 2D-search based discriminant to find ω and ϱ over [0,2π] and [0,π], respectively. The details are omitted for brevity.

Sensing Hidden Vehicles with Multi-Cluster Arrays

Consider the case that the HV arrays consists of four antenna clusters located at the vertices of a rectangle with length L and width W (see FIG. 13). The vertex locations are represented as $\{p^{(k)}=(x^{(k)},y^{(k)})^T\}_{k=1}^4$. Recall that the SV can differentiate the origin from which signal is transmitted due to the usage of different orthogonal waveform set for each array. Let each path be ordered based on HV arrays' index such that $\mathcal{P} = \{\mathcal{P}^{(1)}, \mathcal{P}^{(2)}, \mathcal{P}^{(2)}, \mathcal{P}^{(4)}\}$ where $\mathcal{P}^{(k)}$ represents the set of received signals from the k-th array. Note that the vertices determines the shape and their centroid of HV location. Therefore, the sensing problem is represented as Equation 13, $$\cup_{k=1}^4 \cup_{p \in \mathcal{P}^{(k)}} \{\theta_p, \phi_p, \lambda_p\} \Rightarrow \{\{p^{(k)}\}_{k=1}^4, \omega\}. \quad \text{[Equation 13]}$$

Next, we present a sensing technique exploiting prior knowledge of the HV 4-cluster arrays' configuration, which is more efficient than separately estimating the four positions $\{p^{(k)}\}_{k=1}^4$ using the technique in the preceding section.

Sensing Feasibility Condition

Assume that $\mathcal{P}^{(1)}$ is not empty and $1 \in \mathcal{P}^{(1)}$ without loss of generality. Based on the rectangular configuration of $\{p^{(k)}\}_{k=1}^4$ (see FIG. 13), a system of equations is formed:

$$\begin{cases} v_p \cos(\theta_p) - (d_p - v_p)\cos(\varphi_p + \omega) + \eta_p(\omega, L, W) = \\ \quad v_1 \cos(\theta_1) - (d_1 - v_1)\cos(\varphi_1 + \omega), \\ v_p \sin(\theta_p) - (d_p - v_p)\sin(\varphi_p + \omega) + \zeta_p(\omega, L, W) = \\ \quad v_1 \sin(\theta_1) - (d_1 - v_1)\sin(\varphi_1 + \omega) \end{cases} \quad \text{(P3)}$$

where $$\eta_p(\omega, L, W) = \begin{cases} 0 & p \in \mathcal{P}^{(1)} \\ L \cdot \cos(\omega), & p \in \mathcal{P}^{(2)} \\ L \cdot \cos(\omega) - W \cdot \sin(\omega), & p \in \mathcal{P}^{(3)} \\ -W \cdot \sin, & p \in \mathcal{P}^{(4)} \end{cases} \quad \text{[Equation 14]}$$

and $\zeta_p(\omega, L, W)$ is obtained via replacing all cos and sin in Equation 14 with sin and –cos, respectively. Compared with P1, the number of equations in P3 is the same as 2(P−1) while the number of unknowns increases from P+2 to P+4 because L and W are also unknown. Consequently, P3 has a unique solution when 2(P−1)≥P+4.

Proposition 3 (Sensing feasibility condition) To sense the position, shape, and orientation of a HV with 4-cluster arrays, at least six paths are required:: P≥6.

Remark 2 (Advantage of array-configuration knowledge) The separate positioning of individual HV 4-cluster arrays requires at least 16 NLoS paths (see Proposition 1). On the other hand, the prior knowledge of rectangular configuration of antenna clusters leads to the relation between their locations, reducing the number of required paths for sensing.

Hidden Vehicle Sensing

Consider the case that noise is neglected. P2 is rewritten to the following matrix form:

$$A(\omega)z = B(\omega) \quad \text{(P4)}$$

where $z=(v,d_1,L,W)^T \in \mathbb{R}^{(P+3) \times 1}$ with following the index ordering of $\mathcal{P}$, and $B(\omega)$ is given in Equation 7. For matrix $A(\omega)$, we have Equation 15

$$A(\omega)=[A(\omega)L(\omega)W(\omega)] \in \mathbb{R}^{2(P-1) \times (P+3)}.$$

Here, $A(\omega)$ is specified in Equation 5 and $L(\omega) \in \mathbb{R}^{2(P-1) \times 1}$ is given as $[L^{(cos)}(\omega), L^{(sin)}(\omega)]^T$ where $$L^{(cos)}(\omega) = [\underbrace{0, \ldots, 0}_{|\mathcal{P}^{(1)}|-1}, \underbrace{-\cos(\omega), \ldots, -\cos(\omega)}_{|\mathcal{P}^{(2)}|+|\mathcal{P}^{(3)}|}, \underbrace{0, \ldots, 0}_{|\mathcal{P}^{(4)}|}]^T,$$

and $L^{(sin)}(\omega)$ is obtained by replacing all $\cos(\omega)$ in $L^{(cos)}(\omega)$ with $\sin(\omega)$. Similarly, $W(\omega)$ is given as $[W^{(sin)}(\omega), W^{(cos)}(\omega)]^T$ where $$W^{(sin)}(\omega) = [\underbrace{0, \ldots, 0}_{|\mathcal{P}^{(1)}|+|\mathcal{P}^{(2)}|-1}, \underbrace{\sin(\omega), \ldots, \sin(\omega)}_{|\mathcal{P}^{(3)}|+|\mathcal{P}^{(4)}|}]^T,$$

and $W^{(cos)}(\omega)$ is obtained by replacing all sin in $W^{(sin)}(\omega)$ with –cos.

1) Computing: Noting that P4 is over-determined when P≥6, the resultant discriminant of the orientation ω is similar to Proposition 2 and given as follows.

Proposition 4 (Discriminant of orientation) With P≥6, the unique ω* exists when B(ω*) is orthogonal to the null column space of A(ω*) denoted by null $(A(\omega^*)^T) \in \mathbb{R}^{2(P-1) \cdot (P+1)}$:

$$\text{null}(A(\omega^*)^T)^T B(\omega^*) = 0 \quad \text{[Equation 16]}$$

Given this discriminant, a simple 1D search can be performed over the range [0,2π] to find ω*.

2) Computing $\{p^{(k)}\}_{k=1}^4$: Given the ω*, P4 can be solved by Equation 17

$$z^* = [A(\omega^*)^T A(\omega^*)]^{-1} A(\omega^*)^T B(\omega^*). \quad \text{[Equation 17]}$$

HV arrays' positions can be computed by substituting Equation 16 and Equation 17 into Equation 4 and P3.

Extending the technique to the case with noise is omitted for brevity because it is straightforward by modifying Equation 16 to a minimization problem as in Sec. 3.3.

Case 2: Coupled HV Antenna Clusters

It is desired to reduce the number of waveform sets used by a HV so as to facilitate multi-access by dense HVs. Thus, in this section, we consider the resource-limited case of coupled HV antenna clusters where a single waveform set is shared and transmitted by all HV antenna clusters. The design of SV sensing is more challenging since the SV is incapable of grouping the signal paths according to their originating HV antenna clusters. For tractability, the objectives of SV sensing for this scenario is redefined as: 1) positioning of the centroid of HV antennas denoted by $p_0 = (x_0, y_0)$; 2) sensing the HV size by estimating the maximum distance between a HV antenna and $p_0$, denoted by $$R = \max_k |p^{(k)} - p_0|;$$

3) estimating the HV orientation ω. It follows that the sensing problem can be formulated as (Sensing Problem) $\cup_{p \in \mathcal{P}} \{\theta_p, \phi_p, \lambda_p\} \Rightarrow \{p_0, R, \omega\} \quad \text{[Equation 20]}$ To solve the problem, we adopt the following two-step approach:

Step 1: By assuming that all signals received at the SV originates from the same transmitting location, it is treated as the HV-array centroid and estimated together with the orientation ω using the technique in Section 3.

Step 2: Given ω and $P_0$, the size-parameter R can be estimated by solving optimization problems based on bounding the HV array by either a disk or a box.

The techniques for Step 2 are designed in following sub-sections.

4.2.1 HV-Size Sensing by Disk Minimization

Figure 15:
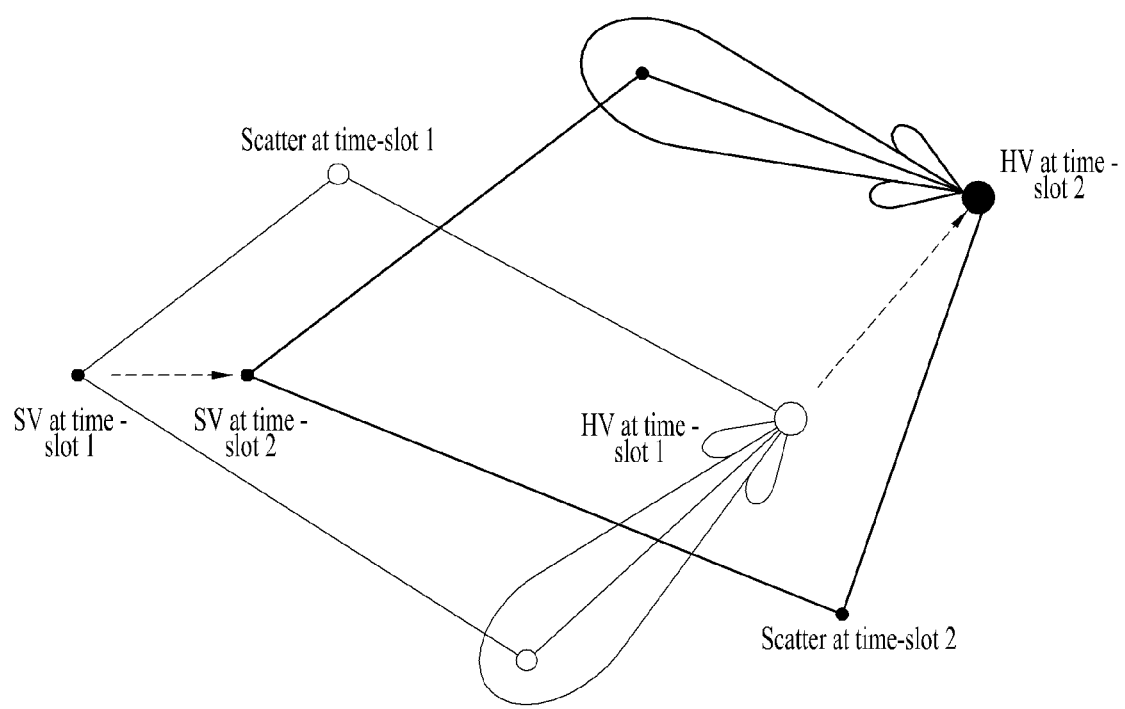
FIG. 15 is sequential path combining and random directional beamforming for coping with insufficient number of propagation paths.

To the purpose of algorithmic design, the HV-array is outer bounded by a disk. Then the problem of estimating detecting the HV-size parameter at the SV can be translated into the optimization problem of minimizing the bounding-disk radius. As shown in FIG. 15(a), we define a sensing disk $\mathcal{C}$ ($p_0$,r) centered at the estimated centroid $p_0$ and having a radius r:

$$\mathcal{C}(p_0, r) = \{(x,y) | (x-x_0)^2 + (y-y_0)^2 \leq r^2\} \quad \text{[Equation 21]}$$

A constraint is applied that all HV antennas, or equivalently the origins of all signal paths received at the SV, should lie within the disk. Then estimating the HV size can be translated into the following problem of disk minimization:

$$R = \min_{d_1, \{v_p\}} r \quad (E5)$$

$$\text{s.t. } (x_p - x_0)^2 + (y_p - y_0)^2 \leq r^2, \forall p \in \mathcal{P},$$

$$0 < v_p < d_1 + c\rho_p, \forall p \in \mathcal{P},$$

$$(x_p, y_p) \text{ satisfies (3) with } d_p = d_1 + c\rho_p, \forall p \in \mathcal{P}$$

where the first constraint is as mentioned above and the second represents the distance after the reflection $v_p$ cannot exceed the total propagation distance $d_p$ represented in terms of $d_1$ and TDoA $\rho_p$ as $d_p = d_1 + c\rho_p$ with $\{\rho_p\}$ being the TDoAs [see Equation 5]. One can observe that Problem E5 is a problem of second-order cone programming (SOCP). Thus, it is a convex optimization problem and can be efficiently solved numerically e.g., using a efficient MatLab toolbox such as CVX.

Analyzing the problem structure can shed light on the number of required paths for HV sensing in the current scenario. The existence and uniqueness of the optimal solution for Problem E5 can be explained intuitively by considering the feasible range of the optimization variable $d_1$. Let $\mathcal{S}_p(r)$ represents the feasible range of given the disk radius r by considering only path p:

$$\mathcal{S}_p(r) = \{d_1 | \text{constraints in } \sqsubset 5\} \quad \text{[Equation 22]}$$

Then the feasible range of $d_1$, denoted as $\mathcal{S}(r)$, can be written as $$\mathcal{S}(r) = \bigcap_{p \in \mathcal{P}} \mathcal{S}_p(r).$$

It is straightforward to show the following monotonicity of $\mathcal{S}(r)$: $\mathcal{S}(r_1) \subseteq \mathcal{S}(r_2)$ if $r_1 \leq r_2$ with $\mathcal{S}(0) = \emptyset$. Based on the monotonicity, one can conclude that there always exists an optimal and unique solution r' for Problem E5 such that $\mathcal{S}(r) \neq \emptyset$ if $r \geq r'$ or otherwise $\mathcal{S}(r) = \emptyset$. In other words, $$r^* = \inf\{r > 0 | \mathcal{S}(r) \neq \emptyset\} = \sup\{r > 0 | \mathcal{S}(r) = \emptyset\} \quad \text{[Equation 23]}$$

The value r' corresponds to the critical case where there exist two feasible-range sets $\mathcal{S}_p(r^*)$ and $\mathcal{S}_p(r^*)$ only contact each other at their boundaries such that $\mathcal{S}(r)$ contains a single feasible point $d_1^*$ that corresponds to r*. This leads to the following proposition.

Proposition 6 (HV-Size Sensing by Disk Minimization) Given the solution for Problem E5, there always exists at least two paths, say $p_1$ and $p_2$, whose originating positions lie on the boundary of the minimized disk $\mathcal{C}$ ($p_0$, r*):

$$(x_{p_1} - x_0)^2 + (y_{p_1} - y_0)^2 = (x_{p_2} - x_0)^2 + (y_{p_2} - y_0)^2 = (r^*)^2 \quad \text{[Equation 24]}$$

Instead of the earlier intuitive argument, Proposition 6 can be proved rigorously using the Karush-Kuhn-Tucker (KKT) condition as shown in Appendix 7.1.

Remark 4 (Feasible Condition of HV Sensing by Disk Minimization) Though two paths are required to determine the optimal disk R=r' based on Proposition 6, at least four paths are required for estimating the required centroid (see Proposition 1).

Remark 5 (Extension to 3D Propagation Model) The extension to 3D propagation model in Section 3.4 is straightforward by using a sphere instead of a circle [see FIG. 14(b)]. The resultant sphere-minimization problem has the same form as Problem E5 except that the first constraint is modified as $$(x_p - x_0)^2 + (y_p - y_0)^2 + (z_p - z_0)^2 \leq r^2, \forall p \in \mathcal{P} \quad \text{[Equation 25]}$$

where the centroid $p_0 = (x_0, y_0, z_0)$ is estimated using the technique in Section 3.4. Again, the problem can be solved by SOCP.

HV-Size Sensing by Box Minimization

In the preceding sub-section, the HV size is estimated by bounding the HV array by a disk and then minimizing it. In this sub-section, the disk is replaced by a box (rectangle) and the HV-size estimation is translated into the problem of box minimization. Compared with disk minimization, the current technique improves the estimation accuracy since a vehicle typically has a rectangular shape. Let and denote the length and width of the rectangular where the HV antenna clusters are placed at its vertices [see FIG. 14.2(c)]. Then the problem of HV-size sensing is to estimate L and W. Recall that the HV-array centroid $p_0$ and HV orientation ω are estimated in Sep 1 of the proposed sensing approach as mentioned. Given $p_0$ and ω, we define a sensing box for bounding the HV array, denoted as B($p_0$,ω,$\ell$,w) as an ω-rotated rectangle centered at $p_0 = (x_0, y_0)$ and having the length l and width w:

[Equation 26]

$$B(p_0, \omega, \ell, w) = \left\{(x, y) \left| -\frac{1}{2}\begin{bmatrix}\ell\\w\end{bmatrix} \preceq R(\omega)\begin{bmatrix}x-x_0\\y-y_0\end{bmatrix} \preceq \frac{1}{2}\begin{bmatrix}\ell\\w\end{bmatrix}\right.\right\}$$

where R(ω) is the counterclockwise rotation matrix with the rotation angle ω given as $$R(\omega) = \begin{bmatrix}\cos(\omega) & \sin(\omega)\\-\sin(\omega) & \cos(\omega)\end{bmatrix} \quad \text{[Equation 27]}$$

and $\preceq$ represents an element-wise inequality. Like disk-minimization in the previous subsection, finding the correct L and W is transformed into the following box-minimization problem:

$$(L, W) = \arg\min_{d_1, \{v_p\}, \ell, \omega}\{\ell^2 + w^2\} \quad (E6)$$

-continued $$\text{s.t.} \quad -\frac{1}{2}\begin{bmatrix} \ell \\ w \end{bmatrix} \leq R(\omega)\begin{bmatrix} x_p - x_0 \\ y_p - y_0 \end{bmatrix} \leq \frac{1}{2}\begin{bmatrix} \ell \\ w \end{bmatrix}, \forall p \in \mathcal{P}$$

$$0 < v_p < d_1 + c\rho_p, \forall p \in \mathcal{P}$$

where the first constraint represent that all origins of signal paths $\{(x_p, y_p)\}$ should be inside $B(p_0, \omega, \ell, w)$ defined in Equation 26 and the second one is the same as in E5.

Problem E6 can be solved by quadratic programming (QP), which is a convex optimization problem and can be efficiently solved using a software toolbox such as MatLab CVX. A result similar to that in Proposition 6 can be obtains for HV-size sensing by box minimization as shown below.

Proposition 7 (HV-Size Sensing by Box Minimization) Given the solution ($\ell^*, w^*$) for Problem E6, there always exists at least two paths, say $p_1$ and $p_2$, whose originating positions lie on two different vertices of the minimized box:

$$R(\omega)\begin{bmatrix} x_{p_1}^* - x_{p_2}^* \\ y_{p_1}^* - y_{p_2}^* \end{bmatrix} = \begin{bmatrix} \ell^* \\ w^* \end{bmatrix} \text{ or } \begin{bmatrix} -\ell^* \\ w^* \end{bmatrix} \text{ or } \quad \text{[Equation 28]}$$

$$\begin{bmatrix} \ell^* \\ 0 \end{bmatrix} \text{ or } \begin{bmatrix} 0 \\ w^* \end{bmatrix}$$

Proof. See Appendix 7.2.

Remark 6 (Feasible Condition of HV Sensing by Box Minimization) A similar remark as Remark 4 for disk minimization also applies to the current technique. Specifically, though two paths are required to determine the optimal box length $L=\ell$ and width $W=w'$ based on Proposition 7, at least four paths are required for estimating the required HV centroid $p_0$ and orientation $\omega$ (see Proposition 1).

Remark 7 (Sensing Box Minimization for Decoupled Antenna Clusters) The technique of HV-size sensing by box minimization developed for the case of coupled HV antenna clusters can be also modified for use in the case of decoupled clusters. Roughly speaking, the modified technique involves separation minimization of four boxes corresponding to the positioning of four clusters. As the modification is straightforward, the details are omitted for brevity. The resultant advantage with respect to the original sensing technique proposed in Section 4.1 is to reduce the minimum number of required paths from 6 (see Proposition 4) to 4.

Figure 14:
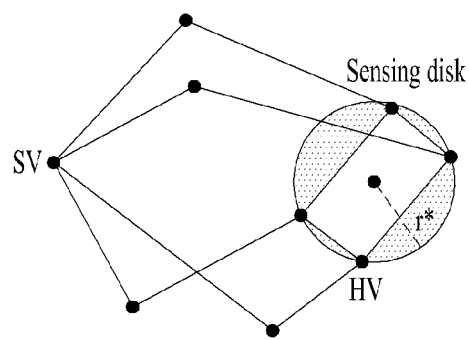
FIG. 14 is various sensing area for positioning
Figure 14:
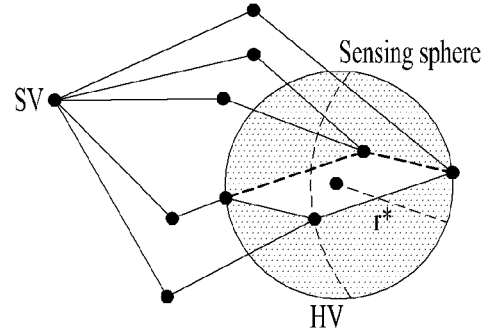
Figure 14:
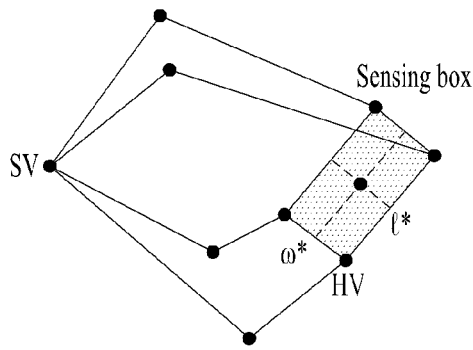
Figure 14:
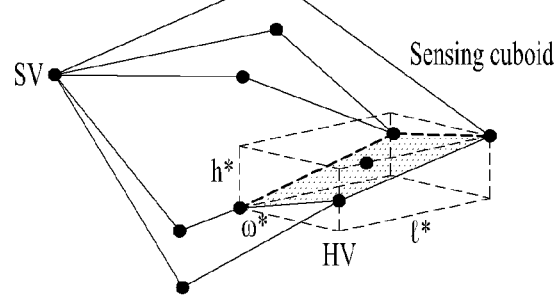

Remark 8 (Extension to 3D Propagation) Similar to Remark 5 for disk minimization, the technique of HV-size sensing by box minimization originally designed for 2D propagation can be extended to the 3D propagation model by using a cuboid instead of a box, yielding the problem of sensing cuboid minimization as illustrated in FIG. 14.2($d$). Compared with E6, the objective function of cuboid minimization is $l^2+w^2+h^1$ where the new variable h is added to represent the height of the cuboid. In addition, the first constraint in E6 is modified as $$-\frac{1}{2}\begin{bmatrix} \ell \\ w \\ h \end{bmatrix} \leq R_{3D}(\omega, \varrho)\begin{bmatrix} x_p - x_0 \\ y_p - y_0 \\ z_p - z_0 \end{bmatrix} \leq \frac{1}{2}\begin{bmatrix} \ell \\ w \\ h \end{bmatrix}, \forall p \in \mathcal{P} \quad \text{[Equation 29]}$$

where $R_{3D}(\omega, \varrho)$ is the 3D counterclockwise rotation matrix with the rotation angles $\omega$ and $\varrho$ as

[Equation 30]

$$R_{3D}(\omega, \varrho) = \begin{bmatrix} \cos(\omega) & -\sin(\omega)\cos(\varrho) & \sin(\omega)\sin(\varrho) \\ \sin(\omega) & \cos(\omega)\cos(\varrho) & -\cos(\omega)\sin(\varrho) \\ 0 & \sin(\varrho) & \cos(\varrho) \end{bmatrix}$$

and the centroid $p_0=(x_0, y_0, z_0)$ are obtained by the technique in Section 3.4. The problem of cuboid minimization is still QP and the solution approach is similar to that for the 2D counterpart.

Coping with Insufficient Multi-Paths

The vehicle sensing techniques designed in the preceding sections require at least four propagation paths to be effective. In practice, it is possible that the number of significant paths may be insufficient, i.e., P<4, due to either sparse scatterers or that most paths are severely attenuated by multiple reflections. To address this practical issue, two solutions are proposed in the following sub-sections, called sequential path combining and random directional beamforming. For simplicity, we focus on the case of single-cluster HV array while the extension to the case of multi-cluster arrays is straightforward.

Sequential Path Combining

Figure 10:
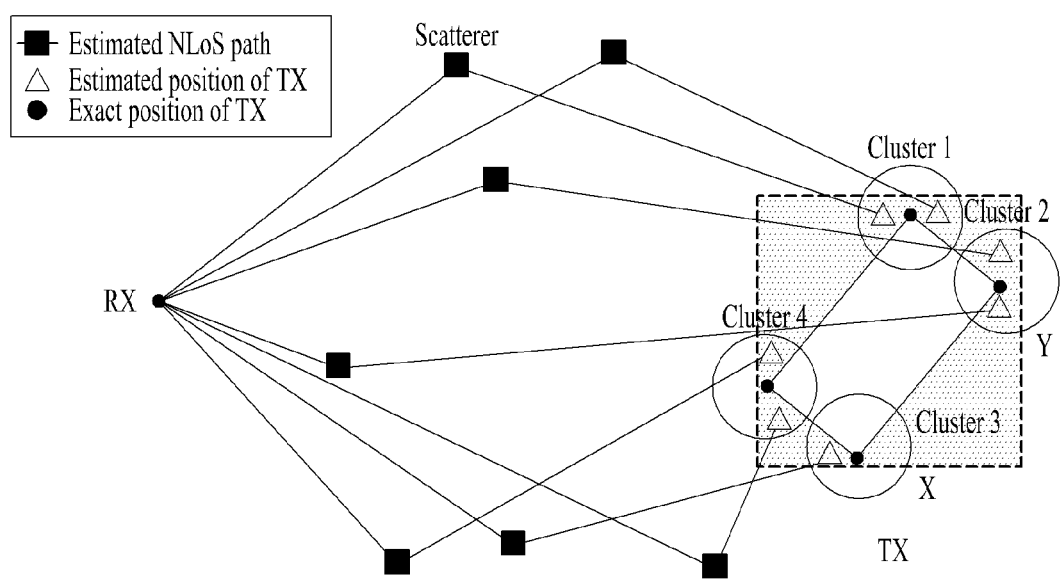
FIG. 10 is clustering for Shape detection
Figure 11:
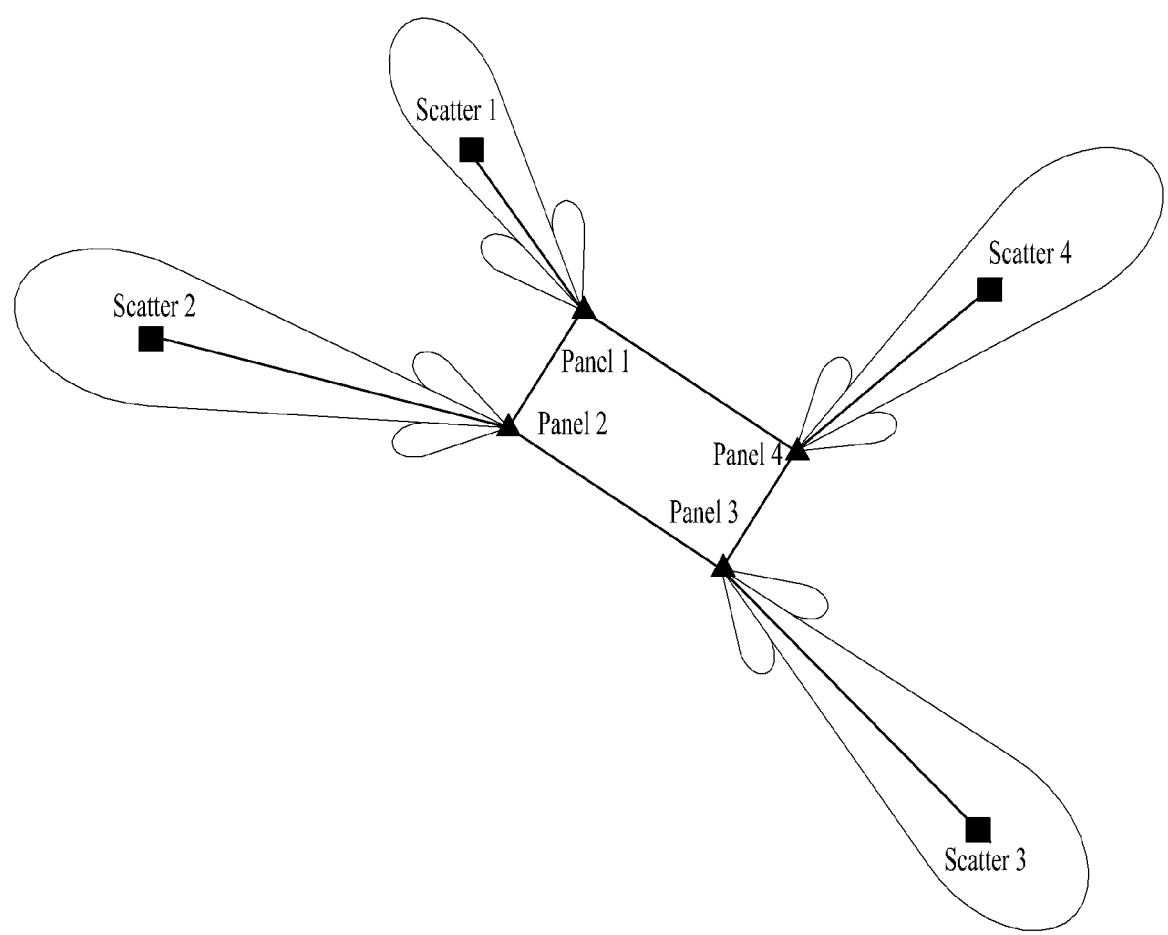
FIG. 11 is directional beamforming for vehicular positioning.

As shown in FIG. 10, the technique of sequential path combining implemented at the SV merges paths from repeated transmissions of HV till a sufficient number of paths is identified for the purpose of subsequent HV sensing. Let M denote the number of HV's M repetitive transmissions with a constant interval denoted by $\Delta$. The interval is chosen to be much larger than the delay-spread of each transmission, enabling SV to differentiate the arrival paths according to their transmission time instants. Let $t_r$ and $\mathcal{P}_n$ denote the time instant of the n-th transmission and the corresponding set of detected paths, respectively. Assume that the relative driving direction and velocity of HV with respect to SV, remain constant within the entire duration of M intervals $m\Delta$. Then the following system of equations are formed:

[Equation 31]

$$\begin{cases} v_p \cos(\theta_p) - (d_p - v_p)\cos(\varphi_p + \omega) + v(n-1)\cos(\omega) = \\ \qquad v_1 \cos(\theta_1) - (d_1 - v_1)\cos(\varphi_1 + \omega), \\ v_p \sin(\theta_p) - (d_p - v_p)\sin(\varphi_p + \omega) + v(n-1)\sin(\omega) = \\ \qquad v_1 \sin(\theta_1) - (d_1 - v_1)\sin(\varphi_1 + \omega) \end{cases}$$

where $p \in \mathcal{P}_n$ and n=1,2, . . . , M. They can be solved following a similar procedure as in Section 4.1. Let $P_{1m}$ be the total number of paths identified due to the M transmissions, i.e., $P_{1m}=|\mathcal{P}_1|+|\mathcal{P}_2|+ \ldots +|\mathcal{P}|$. Noting that the number of equations in Equation 31 is 2($P_{1m}-1$) and the number of unknowns are ($P_{1m}+3$) including $\{v_p\}$, $d_1$, and v. As a result, the condition for the SV collecting sufficient paths for HV sensing is 2($P_{1m}-1$)≤($P_{1m}+3$) or equivalently $P_{1m} \geq 5$. So path combining over multiple sequential transmissions overcomes the practical limitation of insufficient paths.

Random Directional Beamforming

Figure 16:
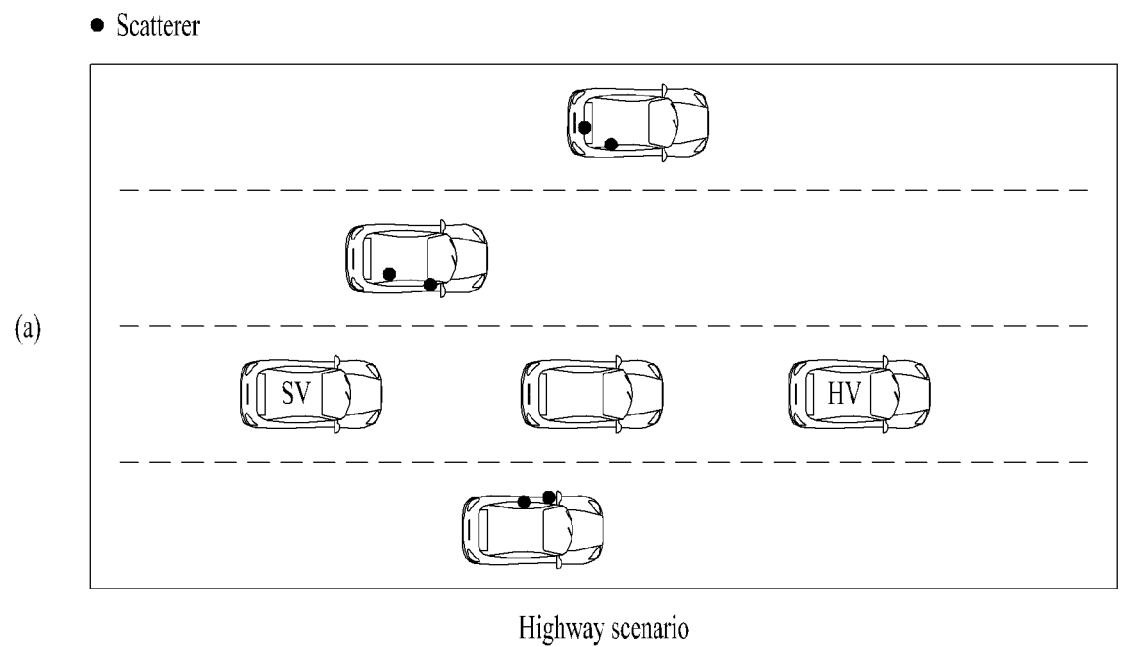
FIG. 16 is two driving scenarios considered in simulation.
Figure 16:
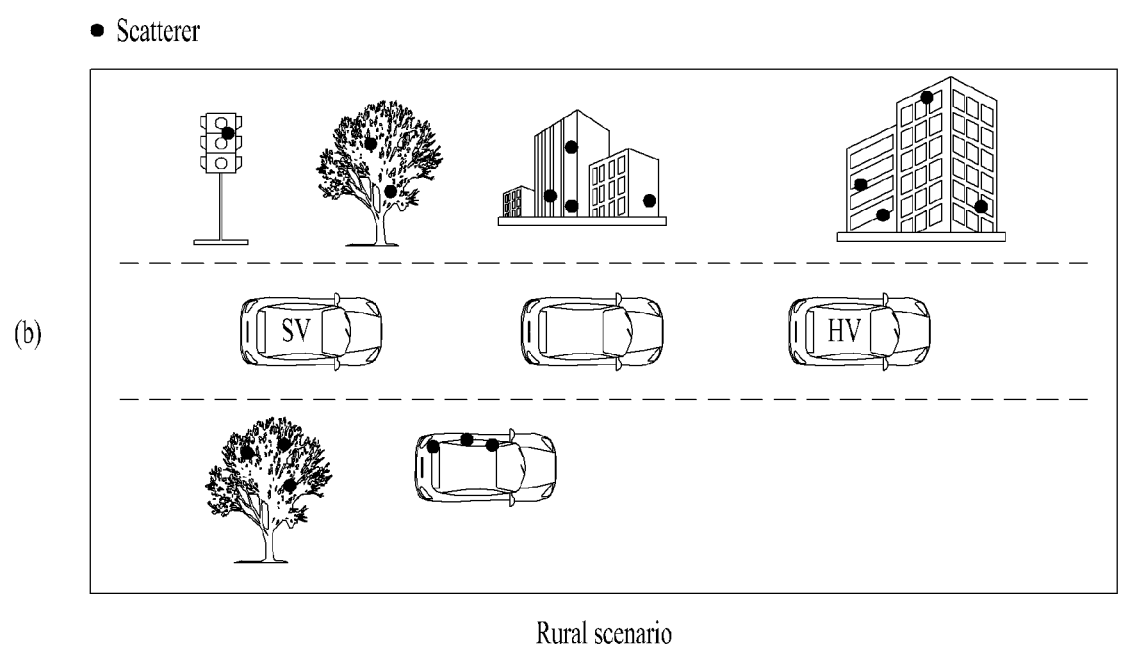

To further enhance the effectiveness of sequential path combining, a directional beam can be randomly (or with predetermined pattern) steered at the HV over sequential transmissions. Transmitter can indicate its beam pattern/beam index/beam switching order/beam size, and etc. to receivers. Its purpose is to reveal some paths that are otherwise hidden to the SV due to severe attenuation. The beam width can be set as ranging from 90° to 30° with gain ranging from 3 dB to 10 dB [30], which helps reach faraway scatters by focusing the transmission power in their directions and thereby and mitigating path loss [31]. Note that a single trial of randomly steered beam may not find enough paths. Thus, it is important to combine the technique with sequential path combining designed in the preceding subsection for the former to be effective. Their integrated operation is illustrated in FIG. 16 and its effectiveness is verified by simulation in the sequel.

Appendix 7.1—Proof of Proposition 6

Using the KKT condition, the optimal solution should satisfy the following equalities $$\sum_{p \in \mathcal{P}} \gamma_p \qquad \text{[Equation 32]}$$

$$\gamma_p \left( 2(x_p - x_0) \frac{\partial x_p}{\partial v_p} + 2(y_p - y_0) \frac{\partial y_p}{\partial v_p} \right) = 0, \qquad \text{[Equation 33]}$$

$$\gamma_p ((x_p - x_0)^2 + (y_p - y_0)^2 - r^2) = 0, \forall\ p \in \mathcal{P} \qquad \text{[Equation 34]}$$

where $\{\gamma_p\}$ represents the Lagragian multiplier of the first constraint in Problem E5. It is worth noting that at least two $\gamma_p$ should be strictly positive to satisfy Equation 32 and Equation 33. From Equation 34, it is obvious to lead Equation 24, completing the proof.

Appendix 7.2—Proof of Proposition 7

Using KKT condition, the optimal solution should satisfy the following equalities:

$$\sum_{p \in \mathcal{P}} | \qquad \text{[Equation 35]}$$

$$\left[ \overline{\gamma}_p \left( \cos(\omega) \frac{\partial x_p}{\partial v_p} + \sin(\omega) \frac{\partial x_p}{\partial v_p} \right) + \qquad \text{[Equation 36]} \right.$$

$$\left. \overline{\mu}_p \left( -\sin(\omega) \frac{\partial x_p}{\partial v_p} + \cos(\omega) \frac{\partial x_p}{\partial v_p} \right) \right] = 0$$

$\overline{\gamma}_p = \gamma_p^{(+)} - \gamma_p^{(-)}$ and $\overline{\mu}_p = \mu_p^{(+)} - \mu_p^{(-)}$ with Lagragian multipliers of the first constraint represented by $\gamma_p^{(+)}, \gamma_p^{(-)}, \mu_p^{(+)}$ and $\mu_p^{(-)}$. The above Largragian multipliers are positive only when the corresponding equalities are satisfied. In other words, either $\gamma_p^{(+)}(\mu_p^{(+)};$ or $\gamma_p^{(-)}(\mu_p^{(-)};$ should be zero.

Some observations are made. First, to satisfy Equation 35 and Equation 36 simultaneously, at least two origins are located in the boundary. Next, it is shown in Equation 36 such that if $\overline{\gamma}_p \neq 0$ then its counterpart multiplier $\overline{\mu}_p \neq 0$, which implies that the origin located in the boundary should be on the vertex. Last, the origin located at the vertex is equivalent to Equation 28, completing the proof.

Simulation Results

The performance of the proposed technique is validated via realistic simulation. The performance metric for measuring positioning accuracy is defined as the average Euclidean squared distance of estimated arrays' positions to their true locations:

$$\frac{1}{4} \sum_{k=1}^{4} \|p^{*(k)} - p^{(k)}\|^2,$$

named average positioning error. We adopt the geometry-based stochastic channel model given in (J. Karedal and et al., "A geometry-based stochastic MIMO model for vehicle-to-vehicle communications," IEEE Trans. Wireless Commun., vol. 8, pp. 3646-3657, July 2009.) for modelling the practical scatterers distribution and V2V propagation channels, which has been validated by real measurement data. Two scenarios, highway and rural, are considered by following the settings in [6, Table 1]. We set $f_o$=5.9 GHz, $B_s$=100 MHz, $M_r$=$M_t$=20, the per-antenna transmission power is 23 dBm. The size of HV is L×W=3×6 m² and distance between SV and HV is 50 m.

Figure 17:
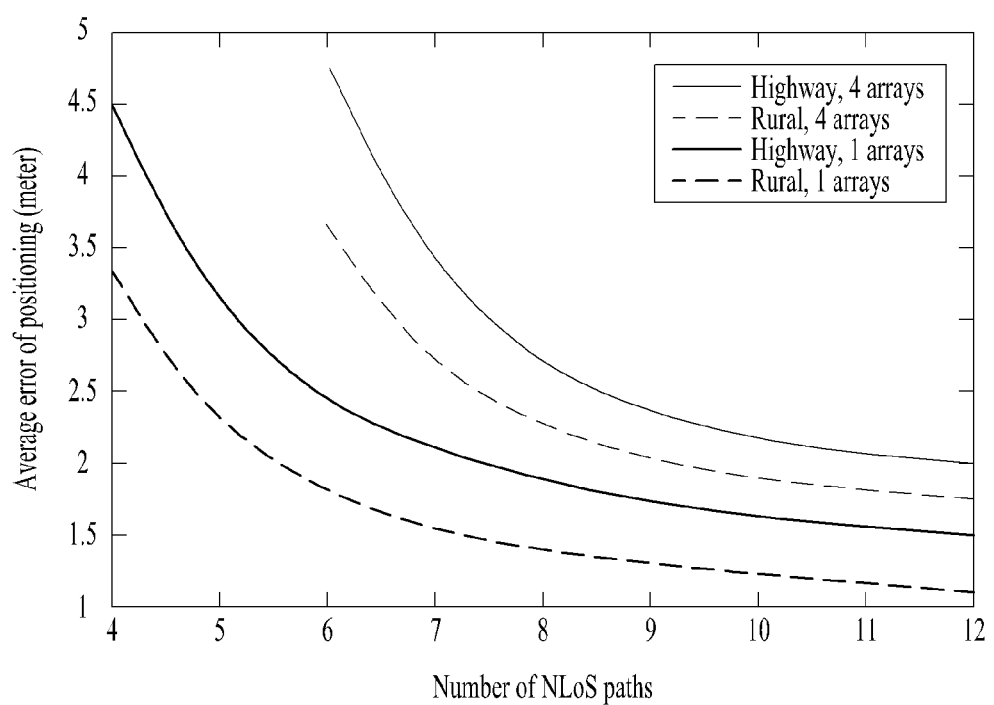
FIG. 17 is effect of number of NLoS paths on average positioning error for single and four arrays.

FIG. 17 shows the curves of average positioning error versus the number of NLoS paths received at SV. It is observed that positioning via and -cluster arrays are feasible when the and, respectively, and receiving more paths can dramatically decrease the positioning error. The error for the -cluster arrays is much larger. This is because more clusters results in more noise, which leads to noisy estimations of AoA/AoD/ToAs within signal detection procedure. Also, compared with -cluster array, two more unknown parameters need to be jointly estimated in the case of -cluster arrays, which impacts the positioning performance. Moreover, the positioning accuracy in the rural scenario is better than that in highway scenario. The reason is that the signal propagation loss in highway scenario is higher than that in rural scenario since the distance between vehicle and scatterers can be large, which adds the difficulty for signal detections.

Figure 18:
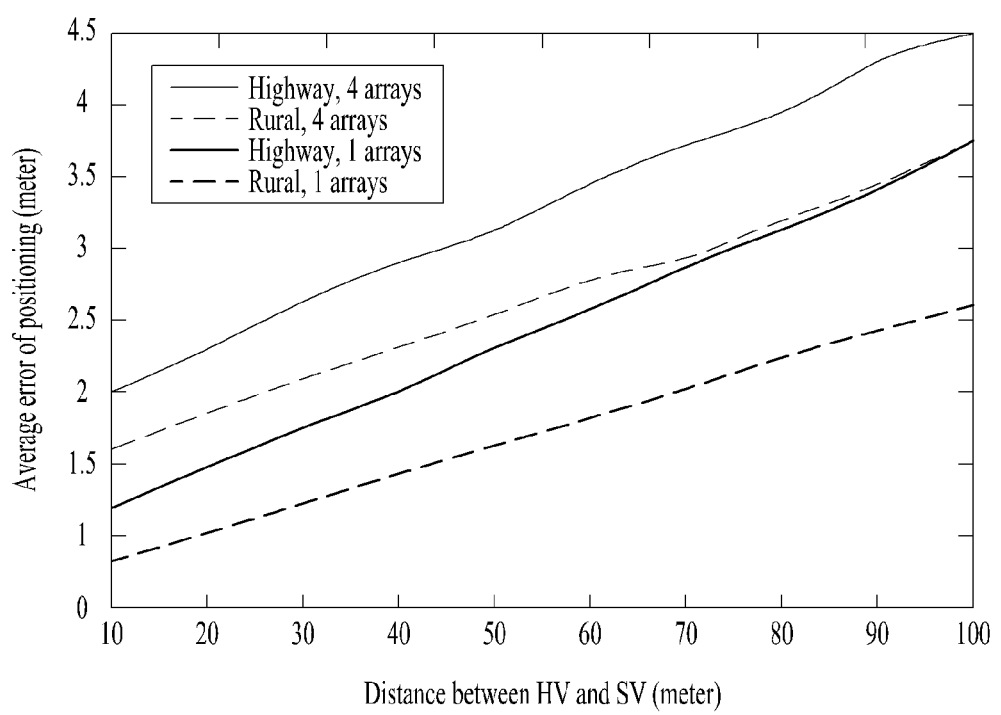
FIG. 18 is Effect of distance between SV and HV on average positioning error for single and four arrays.

In FIG. 18, the distance between SV and HV versus average positioning error is plotted. It is shown that the positioning error increases when SV-HV distance keeps increasing because the accuracy of signal detection reduces when SV-HV distance becomes larger since higher signal propagation loss. The positioning accuracy in rural scenario is higher than that in highway. The reason is that more paths can be received at SV in rural case due to the denser scatterers exists, resulting in higher positioning accuracy as FIG. 17 displays. Moreover, the error gap between highway and rural cases increases with SV-HV distance. This is because, as the SV-HV distance increases, the power of received signals in highway is weaker than those in rural due to larger propagation loss, leading to inaccurate signal detections.

Embodiment 2

In embodiment 1, the hidden vehicle (HV)-sensing technique to detect a single target HV, which is necessary to be extended to cope with multi-HV sensing and detection for improving the signal resource utility and increasing more number of serviced vehicles is proposed. In this embodiment, a waveform based random access technique is proposed to enable simultaneous multi-HV sensing and detection. Specifically, each HV could randomly select a different orthogonal waveform matrix from a large set of waveform codebook for transmission for avoiding the collision case that multiple vehicles select the same waveform matrix at the same time. To further reduce the collision probability, before transmission, each HV detects the waveforms used by nearby peers and selects an another orthogonal waveform. When the collision happens that multiple HVs select the same waveform matrix for transmission at the same time, a spatial clustering approach is proposed to differentiate different HVs and enable the sensing simultaneously. To be specific, based on the receive multi-path NLoS signals, the spatial clustering is enabled by firstly checking AoAs and AoDs feasibility and then calculating pairwise coefficient based on TDoAs. The cluster with the largest size is selected and treated as signal set of one HV. Finally, the HV-sensing technique given in 'L. Cheng, D. Stancil, and F. Bai, "A roadside scattering model for the vehicle-to-vehicle communication channel," IEEE J. Sel. Areas Commun., vol. 31, pp. 449-459, September 2013' is used for each well classified HV. The effectiveness of proposed approach is validated via simulation.

System Model

Figure 19:
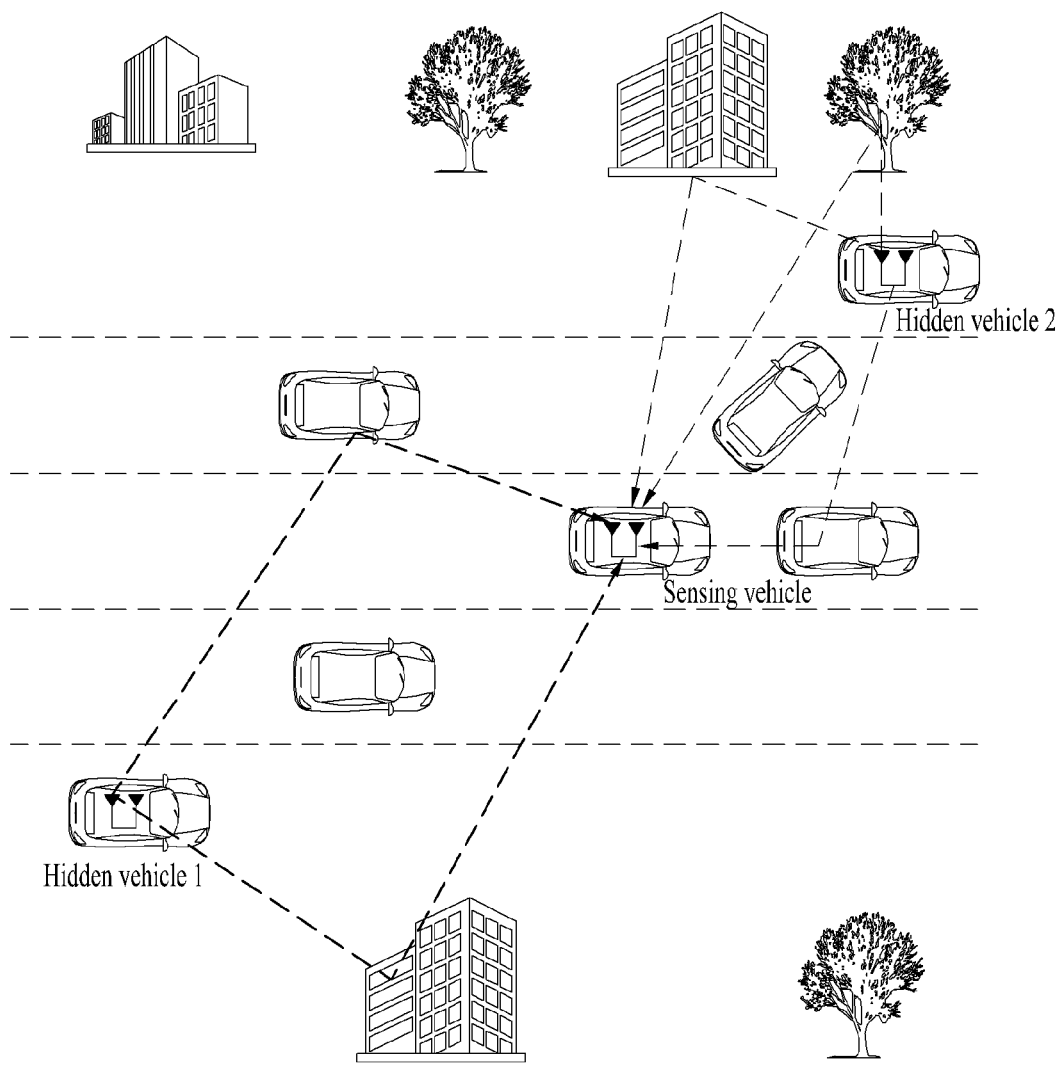
FIG. 19 is Graphical representation of sensing multi-HVs (N=2).

A multi-vehicle network where a sensing vehicle (SV) attempts to detect the relative positions of N HVs as illustrated in FIG. 19 is considered. One antenna cluster comprising a set of collocated antennas with the half-wavelength antenna spacing is deployed on the roof of each vehicle. Signal propagation is assumed to be contained in the 2D plane. The channel model, multi-access, and the corresponding sensing problem are described in the following subsections.

Multi-Path NLoS Channel

Figure 20:
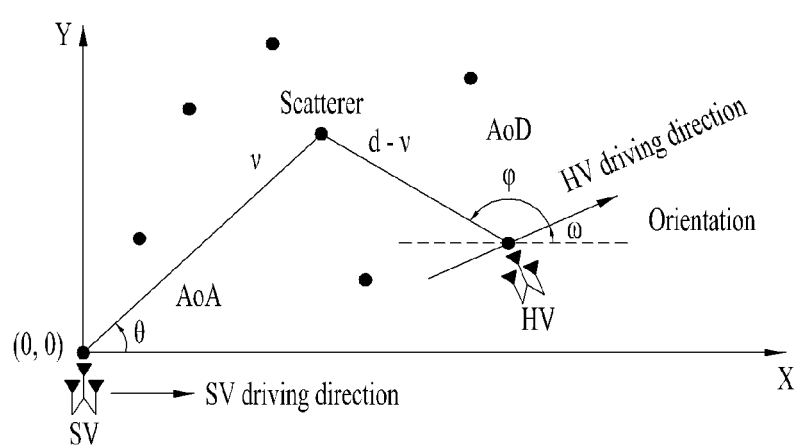
FIG. 20 is geometry of a 2D propagation path and the definitions of parameters.

The NLoS channel between the SV and HV contains multi-paths reflected by a set of scatterers. Following the typical assumption for V2V channels, only the received signals at the SV from paths with single-reflections are considered while higher-order reflections are neglected due to severe attenuation in 'L. Cheng, D. Stancil, and F. Bai, "A roadside scattering model for the vehicle-to-vehicle communication channel," IEEE J. Sel. Areas Commun., vol. 31, pp. 449-459, September 2013.' As mentioned, signal propagation is assumed to be constrained within the horizontal plane. Consider a 2D Cartesian coordinate system as illustrated in FIG. 20 where the SV array is located at the origin and the X-axis is aligned with the orientation of SV. Further consider a typical antenna cluster at the HV. Each NLoS signal path from the HV antenna cluster to the SV array can be characterized by the following five parameters: the AoA at the SV denoted by θ; the AoD at the HV denoted by φ; the orientation of the HV denoted by ω; and the propagation distance denoted by d which is divided into the propagation distance after refection, denoted by v, and the remaining distance (d–v). The AoD and AoA are defined as azimuth angles relative to driving directions of HV and SV, respectively. FIG. 20 graphically shows the definitions of the above parameters.

Waveform Codebook Based Multi-Access

To enable sensing multi-HVs at the SV, a waveform codebook defined as follows is considered. Each antenna cluster at HVs and SV has Mt and Mr antennas with at least half-waveform spacing between adjacent antennas, respectively. In case of sensing single-HV [1], a set of orthogonal waveforms is transmitted over different antennas to allow SV to group the detected paths according to their originating antenna cluster, which is referred to as the identification of the HV. To extend the scenario of multi-HVs, it is necessary to use multiple sets of orthogonal waveforms, which is defined as the waveform codebook, $$\Phi = \{s^{(k)}(t)\}_{k=1}^{K} = \{[s_1^{(k)}(t), \ldots, s_{M_t}^{(k)}(t)]\}_{k=1}^{K}, t \in [0, T_s],$$ [Equation T1]

where s(k)(t) represents the finite-duration baseband waveform in t∈[0,T] assigned to the m-th HV antenna in the k-th waveform set. Then the waveform orthogonality is specified by $\int_0^{T_s} s_{m_1}^{(k)}(t)(s_{m_2}^{(k)}(t))^* dt = \delta(m_1-m_2)$ with the delta function δ(x)=1 if x=0 and 0 otherwise. Waveforms in different sets are orthogonal either.

Each HV selects one set of orthogonal waveforms in the codebook and transmits it in its own timing. Let $\mathcal{N}^{(k)}$ be the set of HVs selecting the k-th set of orthogonal waveform as $\mathcal{N}^{(k_1)} \cap \mathcal{N}^{(k_2)} = \emptyset$ and $$N = \sum_{k=1}^{K} N^{(k)} = \sum_{k=1}^{K} |\mathcal{N}^{(k)}|.$$

Represent the received signal vector at SV as r(t)=[r1(t), . . . , rMr(t)]T that can be written in terms of the codebook Φ={s(k)(t)} as Equation T2, $$r(t) = \sum_{k=1}^{K} \sum_{1n=1}^{N^{(k)}} \sum_{p=1}^{P_n^{(k)}} \gamma_{n,p}^{(k)} b(\theta_{n,p}^{(k)}) a^T(\varphi_{n,p}^{(k)}) s^{(k)}(t - \lambda_{n,p}^{(k)}) + n(t),$$ [Equation T2]

where $\gamma_{n,p}^{(k)}$, $\theta_{n,p}^{(k)}$, $\varphi_{n,p}^{(k)}$ and $\lambda_{n,p}^{(k)}$ denote the complex channel coefficient, AoA, AoD, and ToA of path p originating from HV n selecting the waveform set k, respectively, P(k) represents its n number of paths, and n(t) represents channel noise. HV and SV's response vectors a (φ) and b (θ) are given as Equation T3, $$a(\varphi) = [\exp(j2\pi f_c \alpha_1(\varphi)), \ldots, \exp(j2\pi f_c \alpha_{M_t}(\varphi))]^T$$ [Equation T3]

$$b(\theta) = [\exp(j2\pi f_c \beta_1(\theta)), \ldots, \exp(j2\pi f_c \beta_{M_r}(\theta))]^T,$$ [Equation T4]

where fc denotes the carrier frequency, αm(φ) refers to the difference in propagation time to the corresponding scatterer between the m-th HV antenna and the first HV antenna in the same cluster, and βm(θ) refers to the difference of propagation time from the scatterer to the m-th SV antenna than the first SV antenna. Due to the orthogonal property mentioned above, the SV enables to decompose r(t) Equation T2 into multiple r(k)(t) as Equation T5, $$r^{(k)}(t) = \sum_{n=1}^{N^{(k)}} \sum_{p=1}^{P_n^{(k)}} \gamma_{n,p}^{(k)} b(\theta_{n,p}^{(k)}) a^T(\varphi_{n,p}^{(k)}) s^{(k)}(t - \lambda_{n,p}^{(k)}) + n^{(k)}(t),$$ [Equation T5]

$$k = 1, \ldots, K.$$

It is worth noting that the SV cannot infer the index of HV n explicitly. Thus, r(k)(t) Equation T5 is rewritten as Equation T6, $$r^{(k)}(t) = \sum_{p=1}^{P^{(k)}} \gamma_p^{(k)} b(\theta_p^{(k)}) a^T(\varphi_p^{(k)}) s^{(k)}(t - \lambda_p^{(k)}) + n^{(k)}(t),$$

$$k = 1, \ldots, K.$$

[Equation T6]

where $$P^{(k)} = \sum_{n=1}^{N^{(k)}} P_n^{(k)}.$$

From Equation T6, the three-fold parameters ToA $\{\lambda(k)\}$, AoA $\{\theta(k)\}$ and AoD $\{\varphi(k)\}$ are estimated by using a matched filter and 2D-multiple signal classification (MUSIC) algorithm (See our prior work [1] for details).

Multi Hidden Vehicle Sensing Problem

When only one HV selects the k-th waveform set ($\mathcal{H}^{(k)}=1$), it is straightforward to estimate the position of the HV by using the approach of the single HV problem in [1]. On the other hand, it is challenging to estimate the positions when more than two HVs select the k-th waveform set. To this end, it is required 1) for HVs to avoid selecting the same waveform set as much as possible and 2) for SV to resolve the collision if multi-HVs select the same waveform set.

Waveform Sensing Random Access

This Section Aims at Investigating the Approach of Waveform Sensing to avoid nearby HVs' duplicated waveform selections. Specifically, before selecting the waveform set in the codebook $\Phi$, each HV senses the transmissions of nearby HVs and recognizes the list of waveform sets being used. Then, the HV excludes the sensed waveform sets in the codebook $\Phi$ from its selection. When there is no waveform set in the remaining list, the HV changes its mode to the back-off stage and waits until the back-off timer ends. After the back-off timer is expired, the HV updates the remaining lists by sensing used waveform sets. This procedure repeats until the remaining lists is not empty. It is worth noting that it hardly occurs that the back-off timers of two nearby HVs ends together and select the same waveform because the back-off duration is also randomly selected.

Waveform Collision Resolution by Clustering

In spite of waveform sensing in the preceding subsection, a waveform collision can happen due to the limited sensing range, defined as a hidden vehicle problem as follows.

Definition 1 (Hidden Vehicle Problem). A hidden vehicle problems refers to the case that a waveform collision happen when multi-HVs whose sensing coverages do not overlap select and transmit the same waveform in the codebook (P(k)≥2), which is analogous to the hidden node problem in carrier sensing medium access (CSMA) networks.

Figure 21:
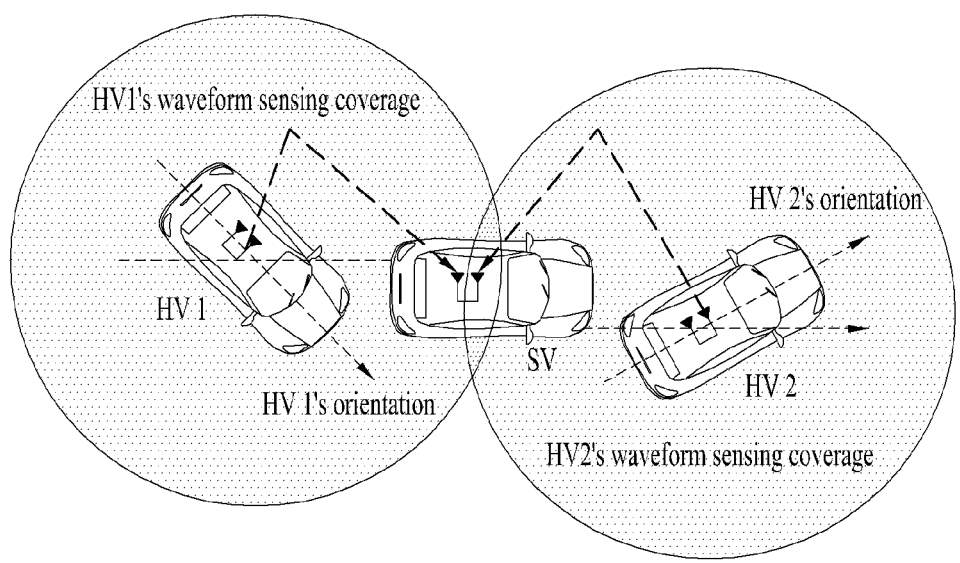
FIG. 21 is Hidden vehicle problem
Figure 22:
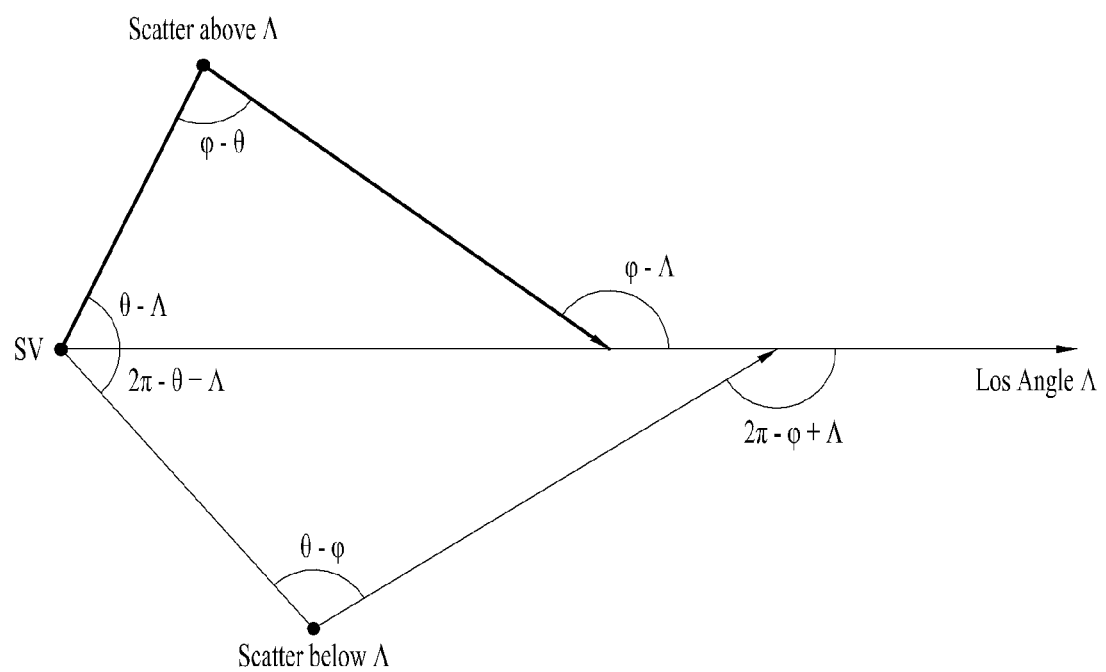
FIG. 22 is Angular feasibility condition

FIG. 21 represents the graphical example of the hidden vehicle problem where two HVs transmitting the same waveform set are well separated by the aid of the waveform sensing mechanism in the preceding section. By using this geometrical property, we attempt to form spatial clusters as signal paths' origins using the estimated TDoA, AoA, and AoD. Specifically, the HV's location is described by two factors. The first is the LoS angle from the x-axis (SV's driving direction) denoted by A and the other is the LoS distance from the origin (SV's location) denoted by D. The hidden vehicle problem can happen when multi-HVs' LoS angles and distances are likely to distinctly different and sufficiently large, respectively. Inspired by the observation, we aim at finding a few candidates of Los angle $\Lambda$ who forms the certain size of cluster and the resultant centroid is referred to as the corresponding D. The entire steps are illustrated in FIG. 22, each of which is introduced in the following.

De-Orientation Precoding

The orientation $\omega$ is an obstacle for the collision resolution because it results in estimating the rotated AoD $\varphi$ (see FIG. 20), making it difficult to perform the AoA/AoD based procedure introduced in the sequel. As a prerequisite step, designing a novel precoding scheme called de-orientation precoding where HV performs precoding to compensate the orientation $\omega$ assuming that HV can track its own $\omega$ in a real-time manner. Specifically, given the orientation $\omega$, the de-orientation precoder $\Pi(\omega)$ is a Mt by Mt matrix which satisfies the following equality condition:

$$a^T(\varphi+\omega)=a^T(\varphi)\Pi(\omega), \forall \varphi=[0,2\pi),$$

where aT ($\varphi$) is HVs' response vector specified in Equation T3. It is worth noting that there exists $\Pi(\omega)$ to satisfy Equation T7 only when the number of transmit antenna Nt is infinite. Instead, the following linear system of equation to design an alternative precoder $\tilde{\Pi}(\omega)$ such that $$a^T\left(\frac{2\pi r}{R}+\omega\right) = a^T\left(\frac{2\pi r}{R}\right)\prod(\omega)^*, \forall r = 1, \ldots, R,$$

[Equation T8]

where R represents the resolution. The above linear system is solved by $$\Pi(\omega_n)=(U(0)^T U(0))^- U(\omega)$$

[Equation T9]

where $$U(\omega) = \left[a\left(\frac{2\pi}{R}+\omega\right), a\left(2\frac{2\pi}{R}+\omega\right), \ldots, a(2\pi+\omega),\right]^T.$$

[Equation T10]

Angular Feasibility Checking

Figure 23:
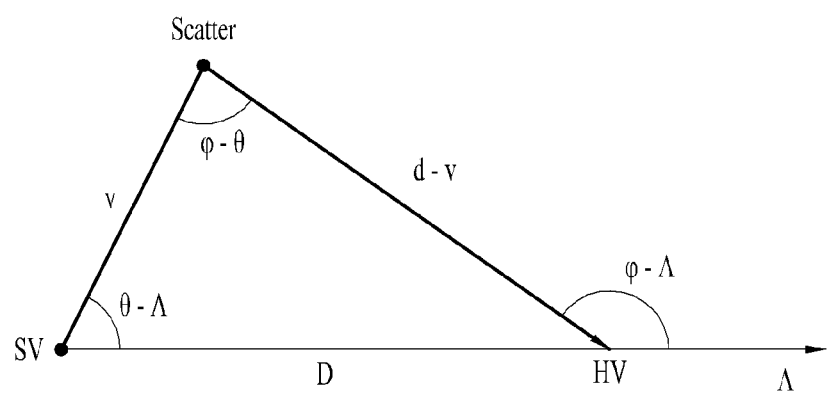
FIG. 23 is Triangle relation between LoS Angle, LoS distance, AoA, AoD

Consider that one LoS angle $\Lambda$ is given. Using AoA $\theta$ and AoD $\varphi$ of each path, the feasibility of the path can be checked such that it is possible to be originated from the certain point on the LoS angle $\Lambda$. The single-reflection NLoS channel model forms the triangle of which the vertices are HV, SV, and the scatter as shown in FIG. 23. Due to the triangular property where the external angle is always larger than the internal angle, the following proposition:

Proposition 1 (Angular Feasibility). Given LoS angle $\Lambda$, path p is said to be angular feasible when the following condition holds:

If $0 \geq \theta p - \Lambda < \pi$ and $0 \leq \varphi p - \Lambda < \pi$, $$0 \leq \theta_p - \Lambda \leq \varphi_p - \Lambda < \pi$$

[Equation T11]

If $\pi \leq \theta p - \Lambda < 2\pi$ and $\pi \leq \mu \varphi p - \Lambda < 2\pi$, $$0 \leq 2\pi - \theta_p + \Lambda \leq 2\pi - \varphi_p + \Lambda \leq \pi$$

[Equation T12]

The first and second cases in Proposition 1 represent that the path's scatter point is beyond and below Λ, respectively. Using the above inequalities, feasible paths are $$\mathcal{S}(\Lambda)$$

selected for the next step, denoted by $\tilde{\mathcal{S}}(\Lambda)$

Pairwise Coefficient Calculation

Figure 24:
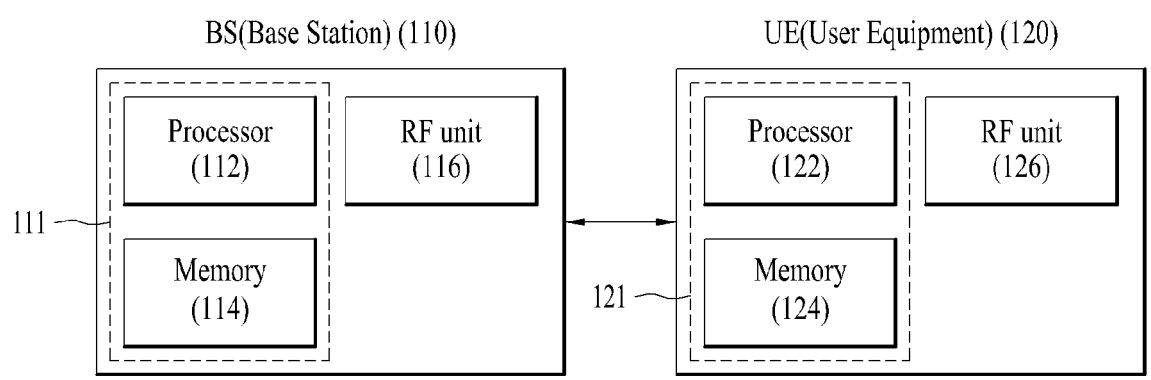
FIG. 24 is a configuration of a transmitting and receiving device.

Given Λ, the pairwise coefficient for every pair of paths in S(Λ) is calculated as follows. Firstly, consider signal path p as shown in FIG. 24. Using Sine theorem, it can be expressed the relation between the LoS distance D, the distance from SV to the scatter vp, and from the scatter to the HV dp–vp as $$\frac{D}{\sin(\varphi - \theta)} = \frac{v_p}{\sin(\pi - \varphi_p + \Lambda)} = \frac{d_p - v_p}{\sin(\Lambda - \theta)}. \quad \text{[Equation T13]}$$

After some manipulations, $$d_p = \underbrace{\frac{\sin(\pi - \varphi_p + \Lambda) + \sin(\Lambda - \theta_p)}{\sin(\varphi_p - \theta_p)}}_{=\alpha_p} D. \quad \text{[Equation T14]}$$

Define the pairwise coefficient βp1,p2 as $$\beta_{p_1, p_2} = \frac{\rho_{p_1} - \rho_{p_2}}{\alpha_{p_1} - \alpha_{p_2}}, \ p_1, p_2 \in \mathcal{S}(\Lambda). \quad \text{[Equation T15]}$$

Recalling that dp is given in terms of d1 and TDoA ρp, i.e., dp=d1+cρp with the light of speed c, the following balance equation is made:

Proposition 2 (Balance Equation). Consider the LoS direction Λ and the corresponding feasible set S(Λ) are given. It is said that one HV exists on the direction of Λ if there exists a subset $\tilde{S}(\Lambda) \subset S(\Lambda)$ whose number of paths are at least three and every pairwise coefficient satisfies the following equality:

$$\beta_{p_1,p_2} = \beta_{p_2,p_3} = \beta_{p_1,p_3} p_1, p_2, p_3 \in \tilde{\mathcal{S}}(\Lambda) \quad \text{[Equation T16]}$$

Largest Cluster Detection

It is difficult to use Proposition 2 directly in case with noise because the estimated ToA/AoA/AoD are corrupted by the noise. It is thus required to modify the above balance equation by relaxing the equality into inequality such that $$\max_{p_1, p_2 \in \mathcal{S}(\Lambda)} |\beta_{p_1} - \beta_{p_2}| \le \delta. \quad \text{[Equation T17]}$$

where δ is the maximum allowance cluster range depending on the level of error. Using Equation T17 and the following optimization formulation, the largest cluster size of the given LoS angle Λ defined as the cluster having the largest number of elements is calculated:

$$S(\Lambda) = \max |\tilde{\mathcal{S}}(\Lambda)| \quad \text{[Equation T18]}$$

$$s.t. \ \tilde{\mathcal{S}}(\Lambda) \subset \mathcal{S}(\Lambda),$$

The optimal LoS angle Λ* is determined by finding Λ having the largest cluster size, namely, $$\Lambda^* = \underset{\Lambda}{\mathrm{argmax}}\, S(\Lambda) \quad \text{[Equation T19]}$$

Estimation of LoS Angles and Distances

We can calculate the position of one HV by applying the ToA/AoA/AoD information into the framework of single HV problem in 'K. Han, S.-W. Ko, H. Chae, B. Kim, and K. Huang, "Sensing hidden vehicles based on asynchronous v2v transmission: A multi-path-geometry approach," Arxiv preprint arXiv:1804.10778'

Apparatuses According to Embodiment of the Disclosure

FIG. 24 illustrates configurations of a transmission point and a UE according to an embodiment of the present disclosure.

Referring to FIG. 24, a transmission point 10 according to the present disclosure may include a receiver 11, a transmitter 12, a processor 13, a memory 14, and a plurality of antennas 15. The plurality of antennas 15 mean that the transmission point 10 supports MIMO transmission and reception. The receiver 11 may receive various UL signals, data, and information from a UE. The transmitter 12 may transmit various DL signals, data, and information to a UE. The processor 13 may provide overall control to the transmission point 10. According to an embodiment of the present disclosure, the processor 12 of the transmission point 10 may process requirements of each of the foregoing embodiments.

Besides, the processor 13 of the transmission point 10 may compute and process information received by the transmission point 10 and information to be transmitted to the outside. The memory 14 may store computed and processed information for a predetermined time, and may be replaced with a component such as a buffer (not shown).

With continued reference to FIG. 24, a UE 20 according to the present disclosure may include a receiver 21, a transmitter 22, a processor 23, a memory 24, and a plurality of antennas 25. The plurality of antennas 25 mean that the UE 20 supports MIMO transmission and reception. The receiver 21 may receive various DL signals, data, and information from an eNB. The transmitter 22 may transmit various UL signals, data, and information to an eNB. The processor 23 may provide overall control to the UE 20.

According to an embodiment of the present disclosure, the processor 23 of the UE 20 may process requirements of each of the foregoing embodiments.

Besides, the processor 23 of the UE 20 may compute and process information received by the UE 20 and information to be transmitted to the outside. The memory 24 may store computed and processed information for a predetermined time, and may be replaced with a component such as a buffer (not shown). The processor is configured to receive signals of 4 paths from the Tx UE, to measure a time of arrival (ToA), an angle of arrival (AoA), an angle of departure (AoD) of each of the signals of 4 paths, to determine each distance between the Rx UE and each scatter of each 4 paths, each distance between the Rx UE and the Tx UE and a driving direction of the Tx UE, based on the ToA, AoA and AoD and to determine a position of the Tx UE based on results of measurement and results of the determination, wherein an assumption that each of x-axis distance and y-axis distance between the Tx UE and Rx UE based on the AoA, AoD and the driving direction of the Tx UE are identical in signal path 1 and signal path p (p=2, 3, 4) is used for determination of the position.

The aforementioned transmission point and UE may be implemented such that the above-described various embodiments of the present disclosure are independently applied or two or more thereof are simultaneously applied, and description of redundant parts is omitted for clarity.

Further, the description of the transmission point 10 in the description of FIG. 24 is applicable to a relay as a DL transmission entity and a UL reception entity, and the description of the UE 20 in the description of FIG. 24 is applicable to a relay as a UL transmission entity and a DL reception entity.

The embodiments of the present disclosure may be achieved by various means, for example, hardware, firmware, software, or a combination thereof.

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The above embodiments of the present disclosure are applicable to various mobile communication systems.

The invention claimed is:

1. A method for determining a position of Tx user equipment (UE) by a Rx UE in a wireless communication system, the method comprising:

receiving, by the Rx UE, signals of at least 4 paths from the Tx UE;

measuring, by the Rx UE, a time of arrival (ToA), an angle of arrival (AoA), an angle of departure (AoD) of each of the signals of 4 paths, determining, by the Rx UE, each distance between the Rx UE and each scatter of each 4 paths, each distance between the Rx UE and the Tx UE and a driving direction of the Tx UE, based on the ToA, AoA and AoD;

determining, by the Rx UE, a position of the Tx UE based on results of measurement and results of the determination, wherein an assumption that each of x-axis distance and y-axis distance between the Tx UE and the Rx UE based on the AoA, AoD and the driving direction of the Tx UE are identical in signal path 1 and signal path p (p=2, 3, 4) is used for determination of the position.

2. The method of claim 1, wherein a distance between the Rx UE and the Tx UE in signal path p is summation of a distance between the Rx UE and the Tx UE in signal path 1 and a distance based on time difference of arrival (TDoA).

3. The method of claim 1, wherein each of the signals of at least 4 paths was reflected only once due to each scatter of each 4 paths.

4. The method of claim 1, wherein the x-axis corresponds to a driving direction of the Rx UE and a position of the Rx UE is an origin of a coordinate.

5. The method of claim 4, wherein the position of the Tx UE corresponds to a location in the coordinate.

6. The method of claim 1, wherein the signals of at least 4 paths are orthogonal each other.

7. The method of claim 1, wherein the Tx UE is a hidden vehicle in None line of sight (NLoS) of the Rx UE.

8. The method of claim 1, wherein the ToA is measured by using a matched filtered.

9. The method of claim 1, wherein the AoA and the AoD are measured by using a 2D multiple signal classification (MUSIC) algorithm.

10. The method of claim 1, wherein the values of the AoA, the AoD, and the ToA are assumed to be constants during a sensing period.

11. The method of claim 1, wherein assumption is expressed in following equation, $$\begin{cases} x_p = v_p\cos(\theta_p) - (d_p - v_p)\cos(\varphi_p + \omega) = \\ \quad v_1\cos(\theta_1) - (d_1 - v_1)\cos(\varphi_1 + \omega), \\ y_p = v_p\sin(\theta_p) - (d_p - v_p)\sin(\varphi_p + \omega) = \\ \quad v_1\sin(\theta_1) - (d_1 - v_1)\sin(\varphi_1 + \omega) \end{cases}, p \in \mathcal{P}.$$

wherein p is path, $\theta_p$ is the AoA, $\varphi_p$ is the AoD, $v_p$ is propagation distances between the Tx UE and the scatter of path p, $d_p$ is a propagation distances between the Tx UE and the Rx UE, $\omega$ is the driving direction of the Tx UE.

12. A Rx user equipment (UE) for determining a position of Tx UE in a wireless communication system, the Rx UE comprising:
- a memory; and
- a processor coupled with the memory,
- wherein the processor is configured to receive signals of at least 4 paths from the Tx UE, to measure a time of arrival (ToA), an angle of arrival (AoA), an angle of departure (AoD) of each of the signals of 4 paths, to determine each distance between the Rx UE and each scatter of each 4 paths, each distance between the Rx UE and the Tx UE and a driving direction of the Tx UE, based on the ToA, AoA and AoD and to determine a position of the Tx UE based on results of measurement and results of the determination,
- wherein an assumption that each of x-axis distance and y-axis distance between the Tx UE and Rx UE based on the AoA, AoD and the driving direction of the Tx UE are identical in signal path 1 and signal path p (p=2, 3, 4) is used for determination of the position.

13. The Rx UE of claim 12, wherein a distance between the Rx UE and the Tx UE in signal path p is summation of a distance between the Rx UE and the Tx UE in signal path 1 and a distance based on time difference of arrival (TDoA).

14. The Rx UE of claim 12, wherein the RX UE is capable of communicating with at least one of another UE, a UE related to an autonomous driving vehicle, the BS or a network.

* * * * *